US011922740B2

(12) United States Patent
Edren et al.

(10) Patent No.: US 11,922,740 B2
(45) Date of Patent: Mar. 5, 2024

(54) VEHICLE SELF-DIAGNOSTICS

(71) Applicant: Zoox, Inc., Foster City, CA (US)

(72) Inventors: Johannes Edren, Belmont, CA (US); Moritz Boecker, Millbrae, CA (US); Joseph Funke, Redwood City, CA (US)

(73) Assignee: ZOOX, INC., Foster City, CA (US)

( * ) Notice: Subject to any disclaimer, the term of this patent is extended or adjusted under 35 U.S.C. 154(b) by 0 days.

(21) Appl. No.: 16/542,153

(22) Filed: Aug. 15, 2019

(65) Prior Publication Data

US 2019/0371093 A1 Dec. 5, 2019

Related U.S. Application Data

(63) Continuation of application No. 15/673,820, filed on Aug. 10, 2017, now Pat. No. 10,395,444.

(51) Int. Cl.
*G07C 5/08* (2006.01)
*G07C 5/00* (2006.01)

(52) U.S. Cl.
CPC ........... *G07C 5/0816* (2013.01); *G07C 5/008* (2013.01); *G07C 5/0808* (2013.01)

(58) Field of Classification Search
CPC ..... G07C 5/0816; G07C 5/0808; G07C 5/008
USPC ........................................................ 701/29.3
See application file for complete search history.

(56) References Cited

U.S. PATENT DOCUMENTS 5,467,268 A 11/1995 Sisley et al.
5,707,117 A * 1/1998 Hu ........................... B60T 8/90 701/72
6,061,623 A * 5/2000 Hippley ............... B60K 31/047 123/352
6,064,973 A 5/2000 Smith et al.
6,115,693 A 9/2000 McDonough et al.
6,134,530 A 10/2000 Bunting et al.
(Continued)

FOREIGN PATENT DOCUMENTS

CN 201646432 * 11/2010
CN 102661749 * 9/2012
(Continued)

OTHER PUBLICATIONS

Non Final Office Action dated Jan. 3, 2019 for U.S. Appl. No. 15/673,829 "Automated Vehicle Diagnostics and Maintenance" Zanghi, 15 pages.
(Continued)

*Primary Examiner* — Muhammad Shafi
(74) *Attorney, Agent, or Firm* — Lee & Hayes P.C.

(57) ABSTRACT

Systems, methods, and apparatuses described herein are directed to vehicle self-diagnostics. For example, a vehicle can include sensors monitoring vehicle components, for perceiving objects and obstacles in an environment, and for navigating the vehicle to a destination. Data from these and other sensors can be leveraged to determine a behavior associated with the vehicle. Based at least in part on determining the behavior, a vehicle can determine a fault and query one or more information sources associated with the vehicle to diagnose the fault. Based on diagnosing the fault, the vehicle can determine instructions for redressing the fault. The vehicle can diagnose the fault in near-real time, that is, while driving or otherwise in the field.

21 Claims, 6 Drawing Sheets

(56) References Cited

U.S. PATENT DOCUMENTS

| | | | |
|---|---|---|---|
| 6,587,851 | B1 | 7/2003 | Ditcharo et al. |
| 6,609,050 | B2 | 8/2003 | Li |
| 8,321,253 | B2 | 11/2012 | Mitchell et al. |
| 8,732,112 | B2 * | 5/2014 | Singh .................. G07C 5/0816 706/51 |
| 8,874,305 | B2 | 10/2014 | Dolgov et al. |
| 8,996,235 | B2 | 3/2015 | Singh et al. |
| 9,205,828 | B1 | 12/2015 | Lombrozo et al. |
| 9,244,462 | B2 | 1/2016 | Pedersen |
| 9,623,905 | B2 | 4/2017 | Shashua et al. |
| 9,633,564 | B2 | 4/2017 | Ferguson |
| 9,849,876 | B2 | 12/2017 | Morales Teraoka et al. |
| 10,065,664 | B1 * | 9/2018 | Hausmann .............. B61L 3/008 |
| 2008/0246335 | A1 * | 10/2008 | Spieker .................. B60T 8/885 303/122.08 |
| 2009/0062978 | A1 | 3/2009 | Picard |
| 2009/0240472 | A1 | 9/2009 | Winnebeck et al. |
| 2014/0163805 | A1 * | 6/2014 | Braunstein .............. E02F 9/265 701/23 |
| 2014/0218508 | A1 * | 8/2014 | Kim ..................... G06V 20/588 348/118 |
| 2015/0348335 | A1 | 12/2015 | Ramanujam |
| 2016/0110148 | A1 * | 4/2016 | Egle ...................... G06F 1/1635 345/173 |
| 2016/0343010 | A1 | 11/2016 | East, III et al. |
| 2017/0123429 | A1 * | 5/2017 | Levinson ............. G05D 1/0088 |
| 2017/0278312 | A1 | 9/2017 | Minster et al. |
| 2017/0297584 | A1 | 10/2017 | Chen et al. |
| 2017/0364869 | A1 | 12/2017 | Tarte et al. |
| 2018/0025558 | A1 * | 1/2018 | Chen ................. B60W 50/0205 701/29.7 |
| 2018/0039580 | A1 | 2/2018 | Schneider |
| 2018/0050704 | A1 * | 2/2018 | Tascione ............... B60W 10/04 |
| 2018/0095456 | A1 * | 4/2018 | Obaidi ................... G07C 5/008 |
| 2018/0225769 | A1 | 8/2018 | Slusar et al. |

FOREIGN PATENT DOCUMENTS

| | | | | |
|---|---|---|---|---|
| EP | 0662608 | | | 7/1995 |
| EP | 0662608 | A2 | * | 12/1995 |
| KR | 20070093714 | A | * | 9/2007 |
| KR | 100880110 | | * | 1/2009 |

OTHER PUBLICATIONS

Office Action for U.S. Appl. No. 15/673,820, dated Sep. 28, 2018, Edren et al., “Vehicle Self- Diagnostics”, 16 pages.

* cited by examiner

VEHICLE SELF-DIAGNOSTICS

This Application is a continuation of, and claims priority to U.S. patent application Ser. No. 15/673,820, filed Aug. 10, 2017, which is incorporated herein by reference.

BACKGROUND

Current technologies are not able to detect all service issues associated with a vehicle.

BRIEF DESCRIPTION OF THE DRAWINGS

The detailed description is described with reference to the accompanying figures. In the figures, the left-most digit(s) of a reference number identifies the figure in which the reference number first appears. The use of the same reference numbers in different figures indicates similar or identical components or features.

DETAILED DESCRIPTION

Figure 1:
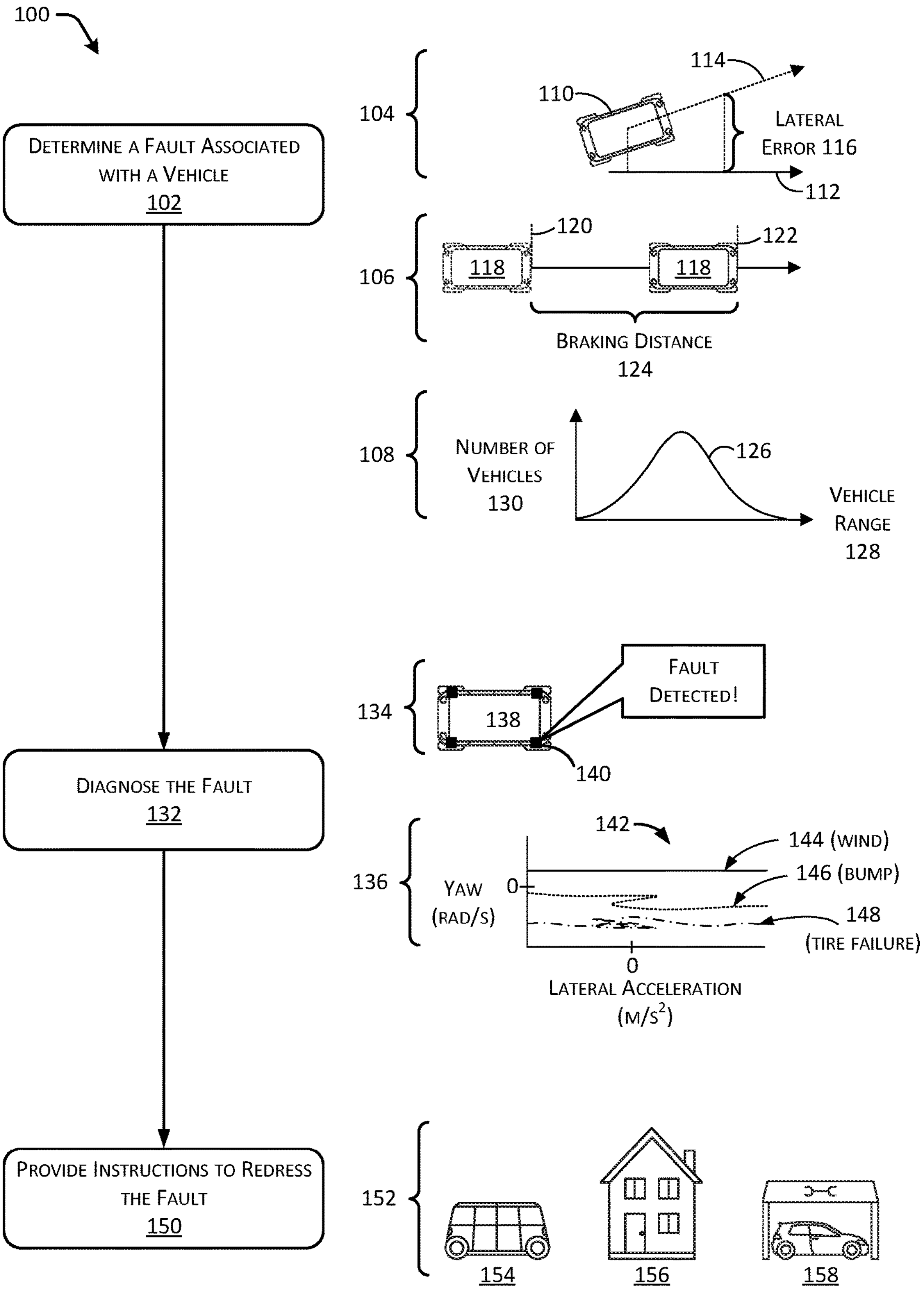
FIG. 1 illustrates a pictorial flow diagram of an example process for vehicle self-diagnostics.

This disclosure describes methods, apparatuses, and systems for vehicle self-diagnostics. For example, a vehicle can include sensors monitoring vehicle components, for perceiving objects and obstacles in an environment, and for navigating the vehicle to a destination. Data from these and other sensors can be leveraged to track a performance of a vehicle over time to determine a state of vehicle components, changes to acceleration/deceleration of the vehicle, changes to steering behavior of the vehicle, etc. In some examples, data from these and other sensors can be further leveraged to determine a fault associated with a vehicle. For the purpose of this discussion, a fault can correspond to an indication that a vehicle is associated with a characteristic that is different than an expected characteristic. In at least one example, the vehicle can diagnose the fault based on querying one or more information sources associated with the vehicle to determine whether a defect, a failure, or other error associated with a component (or multiple components) of a vehicle is causing the fault. Based on a diagnosis, the vehicle can determine a service issue associated with the fault and can execute instructions for redressing the service issue. For example, based on a determination of potential service issues, the vehicle can provide instructions associated with meeting a maintenance technician in a particular location to receive vehicle maintenance, or the vehicle can provide instructions associated with driving to a service center to receive vehicle maintenance.

In at least one example, a vehicle can determine a fault based at least in part on determining that the vehicle is associated with a characteristic that is different than expected. As described below, in some examples, an expected characteristic associated with a vehicle can be determined based on a model of the vehicle. In other examples, an expected characteristic can be determined based on aggregated data indicative of a nominal characteristic of a fleet of vehicles. Based at least in part on determining that a vehicle is associated with a characteristic that is different than expected, the vehicle can determine a fault. For instance, a fault can be associated with a failing hub assembly that causes a vehicle to laterally divert from an expected path of travel and/or cause a vehicle to experience a repeated frequency (e.g., a vibration) that is more significant than a normal repeated frequency. Or, a fault can be associated with a brake component that causes a vehicle to decelerate at a slower rate than expected and/or require more distance to stop than is normal for the vehicle. Additional details associated with determining a fault are described below.

Based at least in part on determining a fault, a vehicle can perform one or more queries to diagnose the fault. That is, the vehicle can send one or more commands to one or more information sources to identify one or more components of the vehicle that are causing the vehicle to be associated with a characteristic that is different than an expected characteristic. As an example, the vehicle can send one or more commands to one or more information sources to identify one or more components of the vehicle that are causing the vehicle to behave differently than expected. In at least one example, the vehicle can query one or more components of a vehicle to determine a state of each of the components. In an example, various components of a vehicle can be associated with component systems. For example, a drivetrain system of the vehicle can be associated with a drivetrain component system, a suspension system of the vehicle can be associated with a suspension component system, a braking system of the vehicle can be associated with a braking component system, etc. A component system can correspond to a microcontroller associated with a component that outputs data indicative of a state of the component. In such an example, the vehicle can leverage the state of the component(s) to diagnose a fault.

In additional and/or alternative examples, a vehicle can send a command to a database inquiring whether a determined characteristic is mapped to, or otherwise associated with, a particular source of a fault. Based on a response to the command, the vehicle can diagnose the fault. Or, in some examples, a vehicle can send a command to a database inquiring whether sensor data associated with the vehicle corresponds to stored data indicative of a particular characteristic associated with other vehicles that are associated with particular sources of faults. Based on a response to the command, the vehicle can diagnose the fault. Furthermore, in some examples, a vehicle can send a command to a control system (i.e., controller) to effectuate a change to a characteristic associated with the vehicle. In some examples, the change can affect a behavior and/or a state of the vehicle. Based on a response to the command, the vehicle can diagnose the fault. Additional details associated with diagnosing a fault are described below.

The methods, apparatuses, and systems described herein can be implemented in a number of ways. Example implementations are provided below with reference to the following figures. Example implementations are discussed in the context of autonomous vehicles. Although discussed in the context of autonomous vehicles, the methods, apparatuses, and systems described herein can be applied to a variety of vehicles, and are not limited to autonomous vehicles. Further, although the operations can be described with respect to one particular type of sensor, the operations discussed herein can be applied to any sensor type or data type.

FIG. 1 illustrates a pictorial flow diagram of an example process 100 for vehicle self-diagnostics.

At operation 102, the process can include determining a fault associated with a vehicle. For example, the operation 102 can include receiving sensor data and determining, based at least in part on the sensor data, a fault associated with a vehicle. In some examples, the operation 102 can determine the fault based on a comparison between a characteristic associated with the vehicle (e.g., determined based on the sensor data) and an expected characteristic associated with the vehicle. In at least one example, the operation 102 can determine a fault based on determining that a characteristic associated with a vehicle does not conform with an expected, or nominal, characteristic of a vehicle as described in detail herein.

Examples 104, 106, and 108 illustrate various types of data and/or information that can be collected, analyzed, and/or evaluated to determine a fault associated with a vehicle, as discussed herein. The example 104 illustrates determining a fault based on a lateral performance of the vehicle; the example 106 illustrates determining a fault based on a longitudinal performance of the vehicle; and the example 108 illustrates determining a fault based on a performance of the vehicle as compared to aggregated data of a fleet of vehicles. As described herein, any data can be captured and/or analyzed to determine fault(s) associated with a vehicle.

The example 104 illustrates an issue with the lateral performance of a vehicle. For example, a vehicle 110 can be an autonomous vehicle that receives instructions from a planner system of the vehicle 110 to traverse an intended path 112 to navigate to a destination. Over time, the vehicle 110 can traverse an actual path 114 that illustrates an actual operation of the vehicle 110. Further, in some examples, there can be a lateral error 116 between the intended path 112 and the actual path 114 traversed by the vehicle 110. The operation 102 can include monitoring the lateral error 116, for example, to determine if the lateral error 116 meets a threshold over a period of time. In some examples, the operation 102 can include integrating the lateral error 116 over a period of time such as an hour, day, week, etc., to determine the error over time. At the operation 102, the vehicle 110 can determine a differential (e.g., the lateral error 116) between the intended path 112 and the actual path 114 and can determine that the differential meets a threshold. Accordingly, the vehicle 110 can determine a fault, as illustrated by the operation 102.

The example 106 illustrates an issue with the longitudinal performance of a vehicle 118 over time. For example, the vehicle 118 can apply vehicle brakes at a first point 120 and can stop at a second point 122. Thus, a braking distance 124 can be associated with the vehicle 118, and can be associated with conditions of the vehicle 118 during application of the vehicle brakes. For example, the braking distance 124 can be associated with vehicle conditions including but not limited to: intended braking force; intended braking distance; road conditions (e.g., wet, dry, pavement, gravel, dirt, etc.); weather conditions (e.g., temperature, pressure, humidity, time of day, etc.); road segments (e.g., locations on a map); distance traveled (e.g., from a previous brake maintenance/adjustment, etc.); vehicle weight; vehicle occupancy; vehicle speed; etc. The operation 102 can include capturing braking data over time (e.g., hours, days, weeks, months, etc.) and analyzing the data to determine changes in braking performance. In an example, if a braking performance is different than an expected braking performance, a differential associated with the difference can be determined and compared to a threshold. If the differential meets the threshold, the operation 102 can determine a fault associated with the vehicle.

Similarly, and not illustrated in the example 106, longitudinal issues associated with the vehicle 118 can include acceleration as well. For example, the vehicle 118 can be commanded to accelerate at a particular rate (i.e., an expected rate), while an actual acceleration can vary from the expected rate. The acceleration of the vehicle 118 can be monitored over time to determine if there are issues with acceleration (e.g., such as increased drag due to other vehicle components). Based on determining that the actual acceleration is different than an expected acceleration, the vehicle 118 can determine a differential between the actual acceleration and the expected acceleration. Based at least in part on determining that the differential meets a threshold, the operation 102 can determine a fault associated with the vehicle.

Furthermore, and not illustrated in the example 104 or the example 106, rotational issues associated with a vehicle 110 can be used to determine a fault. Over time, a vehicle can traverse an actual path that illustrates an actual operation of the vehicle. In some examples, there can be a rotational error between an intended path and an actual path traversed by the vehicle. For instance, a yaw rate (e.g., in radians per second) associated with a vehicle turning a corner can be larger or smaller than an expected yaw rate of the vehicle in turning the corner. The operation 102 can include monitoring the rotational error, for example, to determine if the rotational error meets a threshold over a period of time. In some examples, the operation 102 can include integrating the rotational error over a period of time such as an hour, day, week, etc., to determine the error over time. At the operation 102, the vehicle can determine a differential (e.g., the rotational error) between the intended path and the actual path and can determine that the differential meets a threshold. Accordingly, the vehicle 110 can determine a fault, as illustrated by the operation 102.

The example 108 illustrates an issue with respect to a performance of a fleet of vehicles. For example, in a fleet involving at least two vehicles, performance of individual vehicles can be monitored and aggregated to determine a nominal performance. A nominal performance can correspond to an average performance, a median performance, or some other standardized value indicative of the performance of the fleet of vehicles. In the example 108, aggregated data is illustrated as a distribution 126 representing a vehicle range 128 associated with a number of vehicles 130. For example, the vehicle range 128 can represent a distance that a particular vehicle travels for particular amount of energy input (e.g., battery, gas, diesel, etc.), and the number of vehicles 130 can represent the number of vehicles that with the corresponding range. If a particular vehicle performance is different than an expected vehicle performance, as determined by the nominal performance of the fleet of vehicles, and the differential between the particular vehicle performance and the expected vehicle performance meets a threshold, the operation 102 can determine a fault associated with the particular vehicle. Though depicted in FIG. 1 as a single distribution for illustrative purposes, such an aggregated performance can include multiple distributions of the fleet over various parameters of the vehicle performance.

As can be understood in the context of this disclosure, the operation 102 can leverage any type of data associated with a vehicle (such as an autonomous vehicle). For example, data can include, but is not limited to: light detection and ranging (LIDAR) data; sound navigation and ranging (SONAR) data; radio detection and ranging (RADAR) data; global positioning system (GPS) data; wheel encoder data; inertial measurement unit (IMU) data; engine performance data (e.g., temperature, pressure, RPM, etc.); fuel/energy level; cabin temperature; heating, ventilation, and air conditioning (HVAC) status; braking inputs; steering inputs; tire pressure; vehicle weight; route information (e.g., intended/actual path traveled by the vehicle); environmental factors (e.g., external temperature, pressure, humidity, wind, sun, time of day, season, traffic, etc.); vehicle maintenance history; vehicle navigation history (e.g., average velocity, traffic, etc.); etc. In at least one example, the operation 102 can leverage data from any number of vehicles to generate aggregated data to determine an expected performance of a vehicle.

Further, in at least one example, the operation 102 can include receiving one or more indications from a user that is driving a vehicle, is a passenger in the vehicle, or is otherwise associated with the vehicle. For example, the indication can be received via a computing device associated with the vehicle (e.g., installed in the vehicle providing an interface for the user), or from a computing device associated with the user (e.g., a smartphone of the user). For example, the one or more indications can be associated with a state of the vehicle such as cleanliness, smell, ride performance (e.g., comfort), observations about the vehicle operation (e.g., reporting noises, etc.), etc. In some examples, a vehicle can determine a fault based on the one or more indications from the user.

Moreover, though not illustrated in FIG. 1, in some examples various systems and subsystems of the vehicle can comprise one or more component systems, as described above. In such examples, one or more microcontrollers can provide error code(s) and/or diagnostic functions indicative of a fault in the system and/or subsystem(s) of the vehicle. As several non-limiting examples, various component system(s) can include a tire pressure component system indicating a low pressure, a mass air flow component system indicating a low air flow, an engine temperature component system indicating an engine temperature out of a range, a battery voltage and/or charge state component system indicating a health or charge of a battery, and the like. Additional examples of component systems are described below.

At operation 132, the process can include diagnosing the fault. Based at least in part on determining a fault (e.g., in the operation 102), at operation 132, a vehicle can perform one or more queries to diagnose the fault. That is, the vehicle can send one or more commands to one or more information sources to identify one or more components of the vehicle that are causing the vehicle to be associated with a characteristic that is different than an expected characteristic. For instance, in an example, the vehicle can send one or more commands to one or more information sources to identify one or more components of the vehicle that are causing the vehicle to behave differently than expected. Examples 134 and 136 illustrate various types of data and/or information that can be collected, analyzed, and/or evaluated to diagnose a fault associated with a vehicle, as discussed herein. The example 134 illustrates determining a fault based on a querying a component system associated with a component of a vehicle; the example 136 illustrates querying a database to determine whether data associated with a behavior (or other characteristic) of a vehicle corresponds to stored data indicative of the behavior (or other characteristic) of at least one other vehicle associated with a particular source of a fault.

The example 134 illustrates a vehicle 138 associated with a component system 140. In at least one example, the component system can be associated with a drivetrain system of the vehicle 138 (e.g., a drivetrain component system), a suspension system of the vehicle 138 (e.g., a suspension component system), a braking system of the vehicle 138 (e.g., a braking component system), or any other system of the vehicle 138 (e.g., a tire pressure component system, an engine temperature component system, a mass air flow component system, a battery voltage and/or charge state component system, etc., as described above). As described above, the component system 140 can correspond to a microcontroller associated with a component that outputs data indicative of a state of the component. In such an example, the vehicle 138 can leverage the state of the component(s) to diagnose the fault. That is, in at least one example, at operation 132, the vehicle 138 can send a command to the component system 140 to instruct the component system 140 to provide a state of the associated component. The component system 140 can send a response to the vehicle 138 regarding the state of the associated component. If the state of the associated component indicates that the associated component has failed, the vehicle 138 can diagnose the fault as being associated with the component. As a non-limiting example, the component system 140 can be associated with a hub assembly. When the vehicle 138 sends a command to the component system 140, the component system 140 can report the state of the hub assembly via a response back to the vehicle 138. In an example where the hub assembly is bad or failing, the component system 140 can indicate that the hub assembly is failing (e.g., "fault detected!").

The example 136 illustrates stored data depicted on a graph 142. The graph 142 illustrates a yaw rate (in radians/second) associated with a vehicle on the y-axis and lateral acceleration (in meters/seconds squared) associated with the vehicle on the x-axis. Each point on the graph 142 illustrates motion of a vehicle. Each line on the graph 142 illustrates motion of a vehicle over time. There are three lines 144, 146, and 148 illustrated on the graph 142. Of course, a graph can have any number of lines; three lines are shown as a non-limiting example. As a non-limiting example, the line 144 can correspond to the motion of a vehicle in a crosswind; the line 146 can correspond to the motion of a vehicle as the vehicle drives over a bump; the line 148 can correspond to the motion of a vehicle when a tire of a vehicle becomes incapacitated. In at least one example, data associated with the graph 142 can be stored in a database. In some examples, each line can be determined based on data associated with a single vehicle or a fleet of vehicles. At operation 132, the vehicle can compare the motion of the vehicle (as determined by the sensor data) with stored data indicative of the motion of one or more vehicles associated with a particular source of a fault to determine whether the motion of the vehicle corresponds to any of the stored data. That is, at operation 132, the vehicle can determine whether the motion of the vehicle (as determined by the sensor data) corresponds to any of the lines on the graph 142. If the motion of the vehicle (as determined by the sensor data) corresponds to a line on the graph 142 that is associated with a source of a fault, the vehicle can diagnose the fault based on the source of the fault corresponding to the line on the graph 142.

In additional and/or alternative examples, a vehicle can send a command to a database inquiring whether a determined characteristic is mapped to, or otherwise associated with, a particular source of a fault. Based on a response to the command, the vehicle can diagnose the fault. Or, in some examples, a vehicle can send a command to a control system (i.e., controller) to effectuate a change to a characteristic of the vehicle (e.g., a change to a behavior and/or a state of the vehicle). Based on a response to the command, the vehicle can diagnose the fault. Additional details associated with diagnosing a fault are described below.

It should be understood that while block 102 and block 132 are illustrated as separate operations, in at least one example, block 102 and block 132 can be associated with a single operation. In such an example, a fault can be determined based on the one or more indicators described above.

In at least one example, one or more faults and corresponding sensor data can be input into a machine learned model. Such a machine learned model can associate a most likely diagnosis based on the input. As a non-limiting example, a fault associated with drifting slightly (e.g., lateral error) and sensor data from tire pressure sensors, IMUs, GPS, camera, LIDAR, etc. can be input into an artificial neural network (ANN), the output of which can indicate that tires are bald. In some examples, the output can be associated with some confidence level. In at least one example, a machine learned model can be leveraged at block 102 and/or block 132 to diagnose a fault.

In at least one example, as described herein, a service issue can be determined based on diagnosing a fault. That is, based on determining a hub assembly failure, a hub assembly service issue can be determined. Or, based on determining a tire failure, a tire replacement service issue can be determined. In some examples, if a vehicle is not able to diagnose a fault, the vehicle can log a fault and indicate that the source of the fault and/or service issue associated with the fault is unknown.

At operation 150, the process can include providing instructions to redress the fault. Based at least in part on diagnosing the fault, the vehicle can access, receive, and/or determine instructions to redress the fault. In an example, the vehicle can receive instructions from a central scheduling server. In other examples, the vehicle can determine instructions on a local computing device.

In at least one example, the instructions can direct the vehicle to a particular location. In some examples, the particular location can be based in part on a service issue determined to be associated with the vehicle in view of the fault detected. In some examples, a service issue can be serviced at a mobile location (e.g., by a mobile technician), at a location associated with a technician (e.g., at a home garage associated with the technician), or at a fixed service center. In some examples, a plurality of service issues can be possible, in which case, the most likely service issue and/or most severe service issue can determine the location for the vehicle servicing. In some examples, the location can be based at least in part on availability of mobile technicians or service centers, and/or availability of inventory at respective locations.

An example 152 illustrates various locations for vehicle servicing, as discussed herein. A mobile service vehicle 154 can be associated with a technician that can travel to a vehicle in need of servicing or repair, or to a location associated with the vehicle in need of servicing or repair. A home garage 156 can be associated with a technician as well. However, the home garage 156 can have limited resources and/or can be limited to a type or complexity of service issues addressable at the location. A service center 158 can be an established repair shop capable of addressing nearly all service issues associated with a vehicle. For example, the service center 158 can have specialized equipment for performing maintenance or service, as discussed herein. In some examples, the service center 158 can specialize in addressing various service issues.

In some examples, based at least in part on a severity of a service issue associated with a fault, the instructions can direct the vehicle to perform a safety maneuver in a particular location (e.g., follow a curvilinear trajectory to arrive at a safe stop location, etc.). In such examples, the instructions can direct the vehicle to wait for a mobile technician to meet the vehicle at the particular location. Or, as described above, the instructions can direct the vehicle to a home garage 156, a service center 158, etc. within a threshold amount of time of diagnosing the fault. In additional and/or alternative examples, the instructions can direct the vehicle to continue to drive as instructed until a later time. In such examples, when a service issue does not require immediate servicing, the vehicle can wait to redress the fault until a later time. For example, the vehicle can wait to redress the fault until after a demand for vehicles drops below a threshold, until the vehicle is near a service center, after the end of a driving shift, etc.

In some examples, responsive to diagnosing the fault, the instructions can direct the vehicle to call a teleoperator for assistance in redressing the fault.

Figure 2:
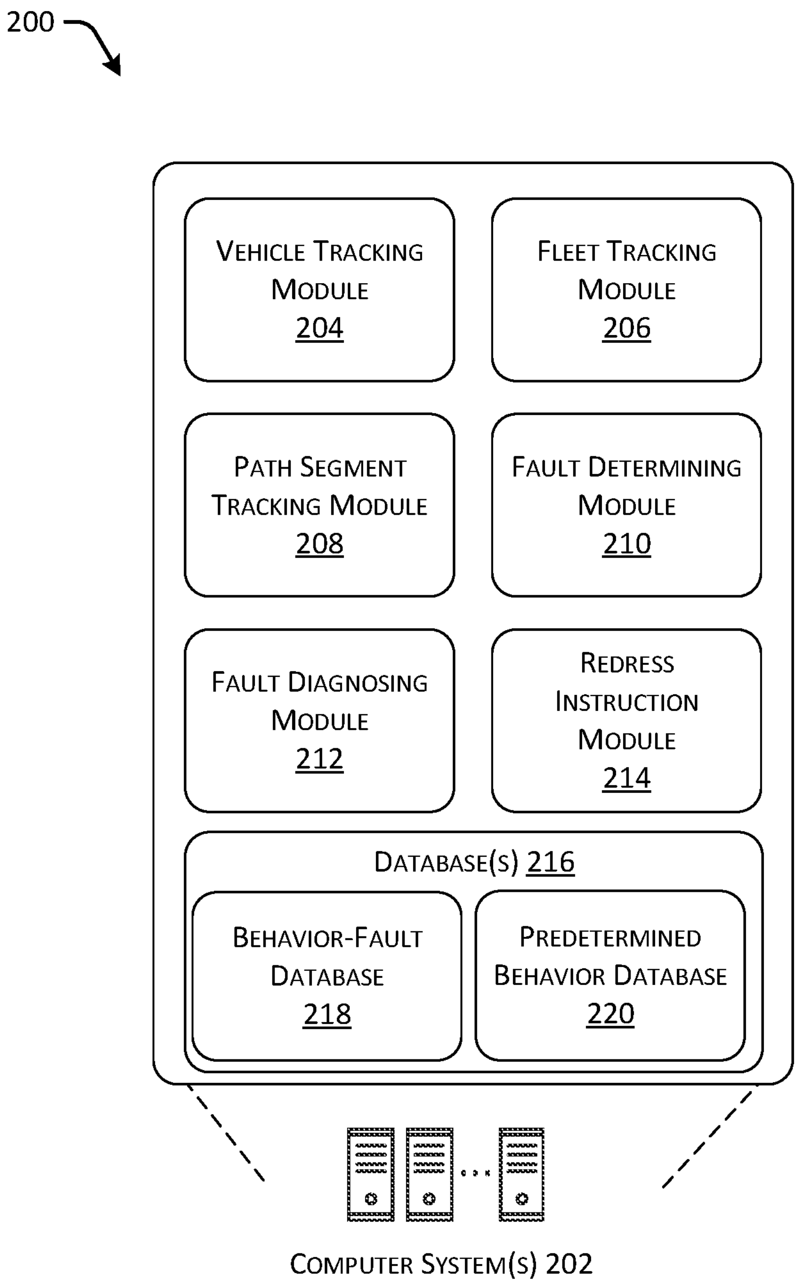
FIG. 2 illustrates an example architecture for vehicle self-diagnostics.

FIG. 2 illustrates an example architecture 200 for vehicle self-diagnostics, as described herein. For example, the architecture 200 can include one or more computer system(s) 202 including various hardware and/or software to implement aspects of the systems, methods, and apparatuses described herein. For example, the computer system(s) 202 can include a vehicle tracking module 204, a fleet tracking module 206, a path segment tracking module 208, a fault determining module 210, a fault diagnosing module 212, a redress instruction module 214, and database(s) 216, including a behavior-fault database 218 and a predetermined behavior database 220.

In some examples, the computer system(s) 202 can be embodied as a central server that receives inputs from one or more autonomous vehicles. In some examples, the computer system(s) 202 can be embodied in an autonomous vehicle. In some examples, the computer system(s) 202 can further provide perception and planning functionality for the autonomous vehicle, and can capture data as discussed herein.

Turning to the vehicle tracking module 204, the vehicle tracking module 204 can include functionality to receive data associated with a vehicle to track vehicle performance over time. For example, the vehicle tracking module 204 can receive raw sensor data from the vehicle, metadata or determinations based at least in part on sensor data from the vehicle, and/or indications from one or more users. In some examples, the vehicle tracking module 204 can receive state information associated with an individual vehicle to determine behavior(s) associated with the vehicle over time. In one example, the vehicle tracking module 204 can receive indications of steering commands, acceleration and deceleration commands, intended paths (e.g., trajectories), and actual paths (e.g., trajectories) taken by an autonomous vehicle, etc., to evaluate a performance of the autonomous vehicle over time. In at least one example, the vehicle tracking module 204 can determine characteristic(s) of a vehicle based on the aforementioned data.

The fleet tracking module 206 can include functionality to aggregate vehicle information associated with a fleet of vehicles. For example, the fleet tracking module 206 can analyze fleet data to determine nominal performance values associated with vehicle operation(s). In some examples, the fleet tracking module 206 can classify various vehicles within a fleet based on vehicle capabilities, models, production years, software versions, etc., to aid in comparison between vehicles. By way of example, and without limitation, the fleet tracking module 206 can track energy usage of a HVAC system for a fleet of vehicles to determine, for a set of similar conditions or environmental factors, nominal performance values of the HVAC system, to determine potential issues with a HVAC system, window and door seals, vehicle insulation, etc. Or, as another non-limiting example, the fleet tracking module 206 can track lateral error for a fleet of vehicles to determine, for a set of similar conditions or environmental factors, a nominal performance value (e.g., an expected lateral error) of the fleet of vehicles, to determine potential issues with a hub assembly or other component(s) associated with a vehicle, the fault of which is likely to cause a vehicle to deviate laterally from an expected path.

The path segment tracking module 208 can include functionality to receive path segment information corresponding to segments of road in an environment, for example. As a plurality of vehicles drive over a segment of road (or a single vehicle drives over the segment of road multiple times) the path segment tracking module 208 can associate vehicle performance with the particular segment of road. The path segment tracking module 208 can determine vehicle operation that is nominal for the path segment, or vehicle operation that is outside the nominal range, to determine potential service issues associated with a vehicle. For example, as a non-limiting example, the path segment tracking module 208 can track lateral error for one or more vehicles in association with a particular road segment to determine, for a set of similar conditions or environmental factors, a nominal performance value (e.g., an expected lateral error) of the one or more vehicles, to determine potential issues with a hub assembly or other component associated with a vehicle, the fault of which is likely to cause a vehicle to deviate laterally from an expected path.

The fault determining module 210 can include functionality for determining a fault associated with a vehicle. In at least one example, the fault determining module 210 can determine a fault based at least in part on determining that the vehicle is associated with a characteristic that is different than expected. For instance, the fault determining module 210 can determine a fault based on an actual behavior of a vehicle differing from an expected behavior of the vehicle. In some examples, the expected behavior can be determined based on a model of the vehicle. For example, in a non-limiting example, the fault determining module 210 can determine that a particular wheel of a vehicle is being subject to more torque than is expected per a model of the vehicle. That is, the fault determining module 210 can compare an amount of torque associated with a particular wheel (as determined based on sensor data) with an amount of torque that is expected to be associated with the particular wheel (according to a model of the vehicle), to determine that the particular wheel is experiencing an atypical (and perhaps undesirable) amount of torque. As such, the fault determining module 210 can determine a fault.

In other examples, the expected behavior can be determined based on aggregated data indicative of a nominal behavior of a fleet of vehicles. For example, in a non-limiting example, the fault determining module 210 can determine that a lateral error associated with a vehicle on a particular road segment is greater than a lateral error that a fleet of vehicles exhibited on the same road segment. That is, the fault determining module 210 can compare a lateral error associated with a vehicle (as determined based on sensor data) with a lateral error that is expected (as determined by a nominal performance of the fleet of vehicles), to determine that the vehicle is deviating too far (laterally) from the travelled path. As such, the fault determining module 210 can determine a fault.

In some examples, the expected behavior can be based on a trajectory associated with an intended path of travel of a vehicle. Or, in additional and/or alternative examples, the expected behavior can be based on a particular segment of road (e.g., path), as described above.

In at least one example, based at least in part on determining that a vehicle is behaving in a way that is different than expected, the fault determining module 210 can determine a fault. As described below, in at least one example, the fault determining module 210 can determine a differential to quantify the difference in expected and actual behaviors. In such examples, the fault determining module 210 can compare the differential with a threshold and can determine a fault based on the relationship between the differential and the threshold. That is, in at least one example, the fault determining module 210 can determine a fault based on determining that an actual behavior associated with a vehicle does not conform with an expected behavior associated with the vehicle.

Additionally, as described above, in some examples, the fault determining module 210 can leverage information received from various systems and subsystems of the vehicle (e.g., component system(s)) to determine a fault. In such examples, one or more microcontrollers associated with the component system(s) can provide error code(s) and/or diagnostic functions indicative of a fault in the system and/or subsystem(s) of the vehicle.

Additional details associated with determining a fault are described below with reference to FIGS. 3 and 4.

The fault diagnosing module 212 can include functionality for diagnosing a fault. In at least one example, based at least in part on determining a fault, the fault diagnosing module 212 can perform one or more queries to diagnose the fault. That is, the fault diagnosing module 212 can send one or more commands to one or more information sources to identify a component (or one or more components) of the vehicle that is causing a behavior of the vehicle to differ from an expected behavior of the vehicle. An information source can be any component of a vehicle that provides information associated with the vehicle. For instance, as described herein, an information source can correspond to a component system of a component of the vehicle, a database 216 (described below), or a control system associated with controlling the behavior and/or state of the vehicle, though any other information source is contemplated.

For example, in at least one example, the fault diagnosing module 212 can query one or more components of a vehicle to determine a state of each of the components. In an example, various components of a vehicle can be associated with component systems, as described above. In additional and/or alternative examples, the fault diagnosing module 212 can send a command to a database inquiring whether a determined behavior is mapped to, or otherwise associated with, a particular source of a fault. Or, in some examples, the fault diagnosing module 212 can send a command to a database inquiring whether sensor data associated with the vehicle corresponds to stored data indicative of the behavior of other vehicle(s) that are associated with a particular source of a fault. Furthermore, in some examples, the fault diagnosing module 212 can send a command to a control system (i.e., controller) to effectuate a change to the behavior and/or the state of the vehicle.

The fault diagnosing module 212 can receive a response to a command and can diagnose a fault based on the response. In some examples, the fault diagnosing module 212 can send commands to more than one information source. In such examples, the fault diagnosing module 212 can receive responses from more than one information source. That is, in such examples, the diagnosing module 212 can leverage redundancy associated with the responses to diagnose a fault.

Additional details associated with diagnosing a fault are described below with reference to FIGS. 3 and 5.

It should be noted that while the aforementioned paragraphs describe the functionality of the fault determining module 210 and the fault diagnosing module 212 with respect to a behavior differential, a fault can be diagnosed using any other algorithm to determine that a characteristic associated with a vehicle does not conform with an expected, or nominal, characteristic of a vehicle as described in detail herein. Furthermore, while the fault determining module 210 and the fault diagnosing module 212 are described as two separate modules, in some examples, a single module can perform functionalities described above with respect to both the fault determining module 210 and the fault diagnosing module 212. In at least one example, the single module can diagnose a fault based on a machine learned model, as described herein.

The fault diagnosing module 212 can include functionality to determine service issues that can be associated with a particular vehicle based at least in part on diagnoses of faults associated with the particular vehicle. For example, the fault diagnosing module 212 can include operations to determine what component(s) of a vehicle can be in need of service based on a diagnosed fault. That is, the fault diagnosing module 212 can determine a service issue based on a diagnosed fault. In some examples, the fault diagnosing module 212 can determine a plurality of service issues that are associated with the vehicle, with individual confidence levels associated with individual service issues. In some examples, the fault diagnosing module 212 can determine one or more error codes associated with a service issue to provide to various modules, or technicians, for example.

In some examples, the fault diagnosing module 212 can include one or more machine learning algorithms to determine faults and/or service issues based on the data discussed herein. That is, one or more machine learning algorithms can leverage sensor data, data associated with determined fault(s) (which can include a confidence level associated with the determined fault), and/or data associated with diagnosed fault(s) to determine service issues. In some examples, the one or more machine learning algorithms can include a neural network. As described herein, a neural network is a biologically inspired algorithm which passes input data through a series of connected layers to produce an output. One example of a neural network can include a deep neural network, or DNN. Each layer in a DNN can also comprise another DNN, or can comprise any number of layers. As can be understood in the context of this disclosure, a neural network can utilize machine learning, which can refer to a broad class of such algorithms in which an output is generated based on learned parameters.

In at least one example, sensor data and/or one or more diagnosed faults and corresponding service issues can be input into a machine learned model. Such a machine learned model can associate a most likely service issue based on the input. As a non-limiting example, a fault indicating that one or more tires are bald can be input into an artificial neural network (ANN), the output of which can indicate that the one or more tires need to be replaced. In some examples, the output can be associated with some confidence level. In additional and/or alternative examples, sensor data from tire pressure sensors, IMUs, GPS, camera, LIDAR, etc. can be input into an artificial neural network (ANN), the output of which can indicate that one or more tires need to be replaced. In some examples, the output can be associated with some confidence level.

Although discussed in the context of neural networks, any type of machine learning can be used consistent with this disclosure. For example, machine learning algorithms for training machine learned model(s) can include, but are not limited to, regression algorithms (e.g., ordinary least squares regression (OLSR), linear regression, logistic regression, stepwise regression, multivariate adaptive regression splines (MARS), locally estimated scatterplot smoothing (LOESS)), example-based algorithms (e.g., ridge regression, least absolute shrinkage and selection operator (LASSO), elastic net, least-angle regression (LARS)), decisions tree algorithms (e.g., classification and regression tree (CART), iterative dichotomiser 3 (ID3), Chi-squared automatic interaction detection (CHAID), decision stump, conditional decision trees), Bayesian algorithms (e.g., naïve Bayes, Gaussian naïve Bayes, multinomial naïve Bayes, average one-dependence estimators (AODE), Bayesian belief network (BNN), Bayesian networks), clustering algorithms (e.g., k-means, k-medians, expectation maximization (EM), hierarchical clustering), association rule learning algorithms (e.g., perceptron, back-propagation, hopfield network, Radial Basis Function Network (RBFN)), deep learning algorithms (e.g., Deep Boltzmann Machine (DBM), Deep Belief Networks (DBN), Convolutional Neural Network (CNN), Stacked Auto-Encoders), Dimensionality Reduction Algorithms (e.g., Principal Component Analysis (PCA), Principal Component Regression (PCR), Partial Least Squares Regression (PLSR), Sammon Mapping, Multidimensional Scaling (MDS), Projection Pursuit, Linear Discriminant Analysis (LDA), Mixture Discriminant Analysis (MDA), Quadratic Discriminant Analysis (QDA), Flexible Discriminant Analysis (FDA)), Ensemble Algorithms (e.g., Boosting, Bootstrapped Aggregation (Bagging), AdaBoost, Stacked Generalization (blending), Gradient Boosting Machines (GBM), Gradient Boosted Regression Trees (GBRT), Random Forest), SVM (support vector machine), supervised learning, unsupervised learning, semi-supervised learning, etc.

In some examples, the one or more machine learned models can be previously trained and stored in association with the fault diagnosing module 212 for use in near-real time.

The redress instruction module 214 can include functionality to access, receive, and/or determine instructions to redress the fault. In an example, the redress instruction module 214 can receive instructions from a central scheduling server. In other examples, the redress instruction module 214 can determine instructions for redressing the fault. In at least one example, the instructions can direct the vehicle to a particular location. In some examples, the particular location can be based in part on a service issue determined to be associated with the vehicle in view of the fault detected. In some examples, a service issue can be serviced at a mobile location (e.g., by a mobile technician), at a location associated with a technician (e.g., at a home garage associated with the technician), or at a fixed service center. In some examples, a plurality of service issues can be possible, in which case, the most likely service issue and/or most severe service issue can determine the location for the vehicle servicing. In some examples, the location can be based at least in part on availability of mobile technicians or service centers, and/or availability of inventory at respective locations.

In some examples, based at least in part on a severity of a service issue associated with a fault, the instructions can direct the vehicle to perform a safety maneuver in a particular location including, but not limited to, following a curvilinear trajectory to arrive at a safe stop location. In such examples, the instructions can direct the vehicle to wait for a mobile technician to meet the vehicle at the particular location. Or, as described above, the instructions can direct the vehicle to a home garage, a service center, etc. within a threshold amount of time of diagnosing the fault. In additional and/or alternative examples, the instructions can direct the vehicle to continue to drive as instructed until a later time. In such examples, when a service issue does not require immediate servicing, the vehicle can wait to redress the fault until a later time. For example, the vehicle can wait to redress the fault until after a demand for vehicles drops below a threshold, until the vehicle is near a service center, after the end of a driving shift, etc. In some such examples, additional constraints can be placed on the vehicle while awaiting servicing. As non-limiting examples, such constraints can include, but are not limited to, a maximum speed, a maximum distance, a maximum torque to be applied, and the like.

In some examples, responsive to diagnosing the fault, the instructions can direct the vehicle to call a teleoperator for assistance in redressing the fault.

The database(s) 216 can include functionality to store data such that it is manageable, updatable, and accessible. In at least one example, the database(s) 216 can include a behavior-fault database 218 and a predetermined behavior database 220. In some examples, the database(s) 216 can include functionality to analyze data that is stored in the database(s) 216, for example, responsive to a command received from the fault diagnosing module 212.

The behavior-fault database 218 can include associations between behavior(s) and source(s) of fault(s). For the purpose of this discussion, a source of a fault can be an incapacitated component of a vehicle, an incapacitated system (one or more components) of a vehicle, a condition, an environmental factor, etc. For example, a particular behavior can be mapped to, or otherwise associated with, one or more sources of faults. As a non-limiting example, a repetitive frequency behavior can be mapped to a source of a fault corresponding to an incapacitated suspension system, an incapacitated tire, a bad road, etc. As another non-limiting example, a lateral error above a threshold can be mapped to a source of a fault corresponding to an incapacitated brake pad, an incapacitated hub assembly, a crosswind, etc. In some examples, each source of a fault can be associated with a confidence value indicative of a likelihood that the source of the fault is associated with the behavior. The confidence value can be determined based on previously diagnosed faults. In additional and/or alternative examples, the behavior-fault database 218 can include associations between characteristic(s) (other than behaviors) and source(s) of fault(s).

The predetermined behavior database 220 can store data indicative of behavior(s) previously exhibited by vehicle(s) associated with particular sources of faults. For example, sensor data associated with one or more vehicles associated with a particular source of a fault associated with a component of a vehicle can be stored in the predetermined behavior database 220 as a representative behavior of one or more vehicles associated with the source of the fault associated with the component of the vehicle. That is, such sensor data can be mapped to, or otherwise associated with, a particular source of a fault associated with the component of the vehicle. As a non-limiting example, a yaw rate and a lateral acceleration rate associated with a vehicle that is driving with a stuck brake pad can be mapped to, or otherwise associated with, a source of a fault corresponding to a stuck brake pad.

Furthermore, in some examples, the predetermined behavior database 220 can store data indicative of behavior(s) previously exhibited by vehicle(s) that are associated with a source of a fault corresponding to a condition and/or environmental factor (e.g., crosswind, etc.). For example, sensor data associated with one or more vehicles that are associated with a source of a fault corresponding to a condition and/or environmental factor can be stored in the predetermined behavior database 220 as a representative behavior of one or more vehicles associated with a source of a fault corresponding to a condition and/or environmental factor. As a non-limiting example, a yaw rate and a lateral acceleration rate associated with a vehicle that is driving in a crosswind can be mapped to, or otherwise associated with, a source of a fault corresponding to a crosswind.

While yaw rate and lateral acceleration are described above, any data item associated with sensor data can be mapped to, or otherwise associated with a particular source of a fault. Furthermore, while associations between data indicative of behavior(s) previously exhibited by vehicle(s) and particular sources of faults are described above with respect to the behavior-fault database 218, the behavior-fault database 218 can additionally and/or alternatively associate characteristic(s) (other than behaviors) with particular source(s) of fault(s).

Additional details of the computer system(s) 202 are provided below in connection with FIG. 6.

Figure 3:
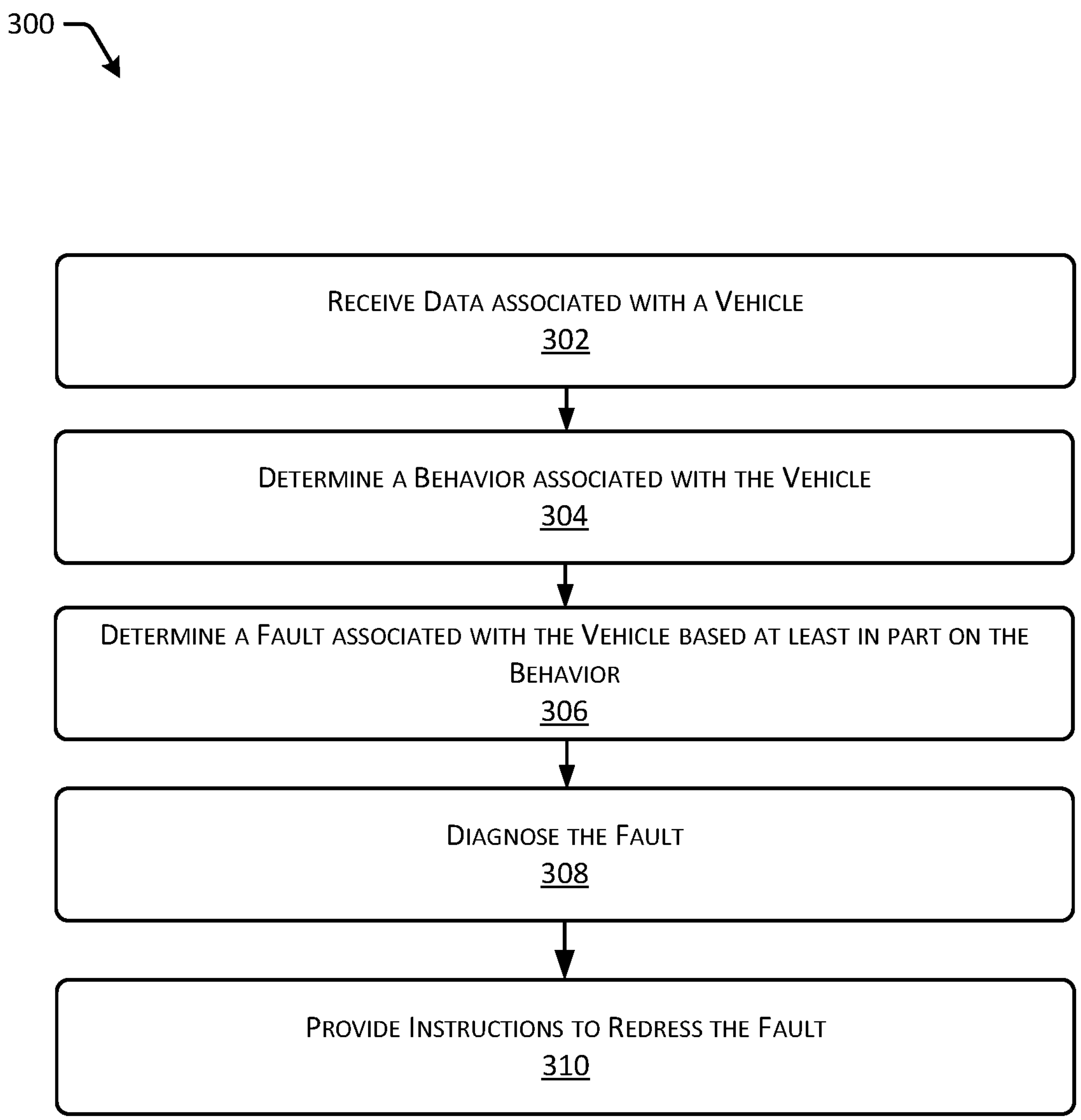
FIG. 3 depicts an example process for determining a fault associated with an autonomous vehicle and diagnosing the fault to provide instructions for redressing the fault.
Figure 4:
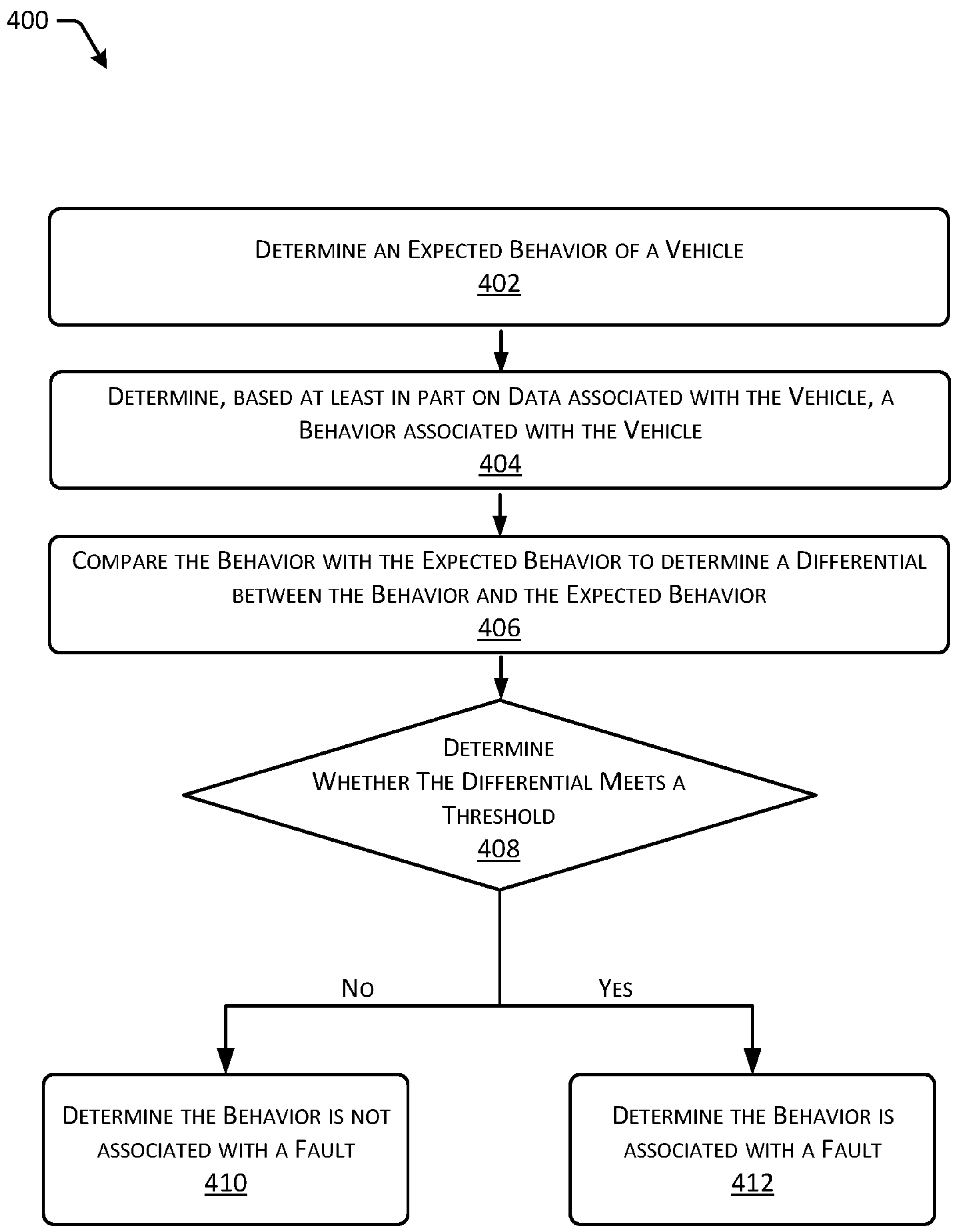
FIG. 4 depicts an example process for determining a fault associated with an autonomous vehicle.
Figure 5:
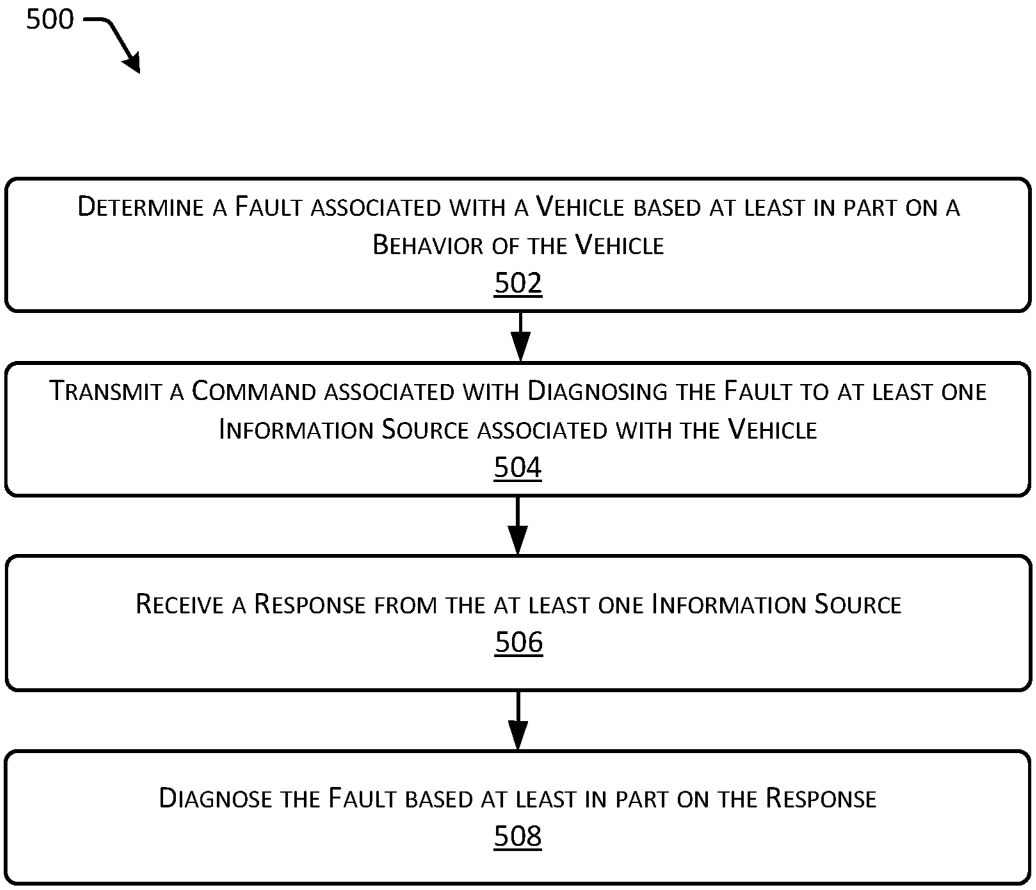
FIG. 5 depicts an example process for diagnosing a fault associated with an autonomous vehicle.

FIGS. 3-5 illustrate example processes in accordance with embodiments of the disclosure. These processes are illustrated as logical flow graphs, each operation of which represents a sequence of operations that can be implemented in hardware, software, or a combination thereof. In the context of software, the operations represent computer-executable instructions stored on one or more computer-readable storage media that, when executed by one or more processors, perform the recited operations. Generally, computer-executable instructions include routines, programs, objects, components, data structures, and the like that perform particular functions or implement particular abstract data types. The order in which the operations are described is not intended to be construed as a limitation, and any number of the described operations can be combined in any order and/or in parallel to implement the processes.

FIG. 3 depicts an example process 300 for determining a fault associated with an autonomous vehicle and diagnosing the fault to provide instructions for redressing the fault. For example, some or all of the process 300 can be performed by one or more components in the architecture 200, or in the environment 600, as described herein.

At operation 302, the process can include receiving data associated with a vehicle. In at least one example, the computer system(s) 202 can receive raw sensor data, which can include, but is not limited to: LIDAR data; SONAR data; RADAR data; GPS data; wheel encoder data; IMU data; engine performance data (e.g., temperature, pressure, RPM, etc.); fuel/energy level; cabin temperature; HVAC status; braking inputs; steering inputs; tire pressure; vehicle weight; route information (e.g., intended/actual path traveled by the vehicle); environmental factors (e.g., external temperature, pressure, humidity, wind, sun, time of day, season, traffic, etc.); vehicle maintenance history; vehicle navigation history (e.g., average velocity, traffic, etc.); etc. As described above, in some examples, the operation 302 can include receiving data associated with one or more indications from a passenger (or a user), such as from a computing device operating in conjunction with an autonomous vehicle, and/or from an application operating on a computing device associated with the user (e.g., a smartphone).

At operation 304, the process can include determining a behavior associated with the vehicle. In at least one example, one or more modules associated with the computer system(s) 202 (e.g., the vehicle tracking module 204, etc.) can determine a behavior associated with the vehicle. For example, the vehicle tracking module 204 can receive raw sensor data from the vehicle, metadata or determinations based at least in part on sensor data from the vehicle, and/or indications from one or more users. In some examples, the vehicle tracking module 204 can receive state information associated with an individual vehicle to determine behavior(s) associated with the vehicle. In one example, the vehicle tracking module 204 can receive indications of steering commands, acceleration and deceleration commands, intended paths (e.g., trajectories), and actual paths (e.g., trajectories) taken by a vehicle, etc., to evaluate a performance of the vehicle and/or to determine a behavior associated with the vehicle.

In some examples, the vehicle tracking module 204 can determine lateral behavior(s) associated with a vehicle, longitudinal behavior(s) associated with a vehicle, and/or rotational behavior(s) associated with a vehicle. In at least one example, the vehicle tracking module 204 can determine a behavior associated with a repetitive frequency (e.g., vibration) associated with a vehicle. Further, in at least one example, the vehicle tracking module 204 can determine a behavior associated with an actuator response of an actuator associated with a vehicle. In some examples, the behavior of a vehicle can correspond to a pose of a vehicle (e.g., a position of the vehicle and an orientation of the vehicle), a velocity of the vehicle, etc.

In at least one example, the behavior can correspond to the behavior of the vehicle at a particular time, or over a period of time. That is, in at least one example, the vehicle tracking module 204 can integrate a behavior of the vehicle over a period of time such as an hour, day, week, etc., to determine the behavior over time.

Additionally and/or alternatively, as described above, in some examples, the fault determining module 210 can leverage information received from various systems and subsystems of the vehicle (e.g., component system(s)) to determine a fault. In such examples, one or more microcontrollers can provide error code(s) and/or diagnostic functions indicative of a fault in the system and/or subsystem(s) of the vehicle.

At operation 306, the process can include determining a fault associated with the vehicle based at least in part on the behavior. In at least one example, the fault determining module 210 can determine a fault based at least in part on determining that the vehicle is behaving differently than expected. That is, the fault determining module 210 can determine a fault based on an actual behavior of a vehicle differing from an expected behavior of the vehicle. In some examples, the expected behavior can be determined based on a model of the vehicle. In other examples, the expected behavior can be determined based on aggregated data indicative of a nominal behavior of a fleet of vehicles. Based at least in part on determining that a vehicle is behaving in a way that is different than expected, the fault determining module 210 can determine a fault. As described below, in at least one example, the fault determining module 210 can determine a differential to quantify the difference in expected and actual behaviors. In such examples, the fault determining module 210 can compare the differential with a threshold and can determine a fault based on the relationship between the differential and the threshold. Though described in FIG. 3 as a differential for illustrative purposes, any other algorithm can be performed to determine that a behavior associated with a vehicle does not conform with an expected, or nominal, behavior of a vehicle as described in detail herein.

Additional details associated with determining a fault are described below with reference to FIG. 4.

In at least one example, the operation 306 can be performed in near-real time. That is, in at least one example, the fault determining module 210 can determine a fault based on the behavior of the vehicle within a threshold amount of time of receiving raw sensor data. In some examples, such as when the computer system(s) 202 are embodied in an autonomous vehicle, the operation 306 can be performed while the autonomous vehicle is driving, or otherwise in the field.

At operation 308, the process can include diagnosing the fault. In at least one example, the fault diagnosing module 212 can include functionality for diagnosing a fault. In at least one example, based at least in part on determining a fault, the fault diagnosing module 212 can perform one or more queries to diagnose the fault. That is, the fault diagnosing module 212 can send one or more commands to one or more information sources to identify a component (or multiple components) of the vehicle that is causing the vehicle to behave in a way that is different than expected. As described herein, an information source can correspond to a component system of a component of the vehicle, a database 216, described above, or a control system associated with controlling the behavior and/or state of the vehicle.

For instance, in at least one example, the fault diagnosing module 212 can query one or more components of a vehicle to determine a state of each of the components. In an example, various components of a vehicle can be associated with component systems, as described above. In additional and/or alternative examples, the fault diagnosing module 212 can send a command to a database inquiring whether a determined behavior is mapped to, or otherwise associated with, a particular source of a fault. Or, in some examples, the fault diagnosing module 212 can send a command to a database inquiring whether sensor data associated with the vehicle corresponds to stored data indicative of the behavior of other vehicle(s) that are associated with a particular source of a fault. Furthermore, in some examples, the fault diagnosing module 212 can send a command to a control system (i.e., controller) to effectuate a change to the behavior and/or the state of the vehicle.

The fault diagnosing module 212 can receive a response to a command and can diagnose a fault based on the response. In some examples, the fault diagnosing module 212 can send commands to more than one information source. In such examples, the fault diagnosing module 212 can receive responses from more than one information source. That is, in such examples, the diagnosing module 212 can leverage redundancy associated with the responses to diagnose a fault.

Additional details associated with diagnosing a fault are described below with reference to FIG. 5. Furthermore, while operations 306 and 308 are illustrated as distinct operations, in some examples, operations 306 and 308 can be combined into a single operation. That is, in some examples, the fault determining module 210 and/or the fault diagnosing module 212 can leverage sensor data to diagnose a fault, by use of a machine learned model, for example. Furthermore, while operations 306 and 308 are described above in the context of behavior(s), in additional and/or alternative examples, a fault can be determined and/or diagnosed utilizing any algorithm that can determine that a characteristic associated with a vehicle does not conform with an expected, or nominal, characteristic of a vehicle as described in detail herein.

The fault diagnosing module 212 can include functionality to determine service issues that can be associated with a particular vehicle based at least in part on diagnoses of faults associated with the particular vehicle. For example, the fault diagnosing module 212 can include operations to determine what component(s) of a vehicle can be in need of service based on a diagnosed fault. In some instances, the fault diagnosing module 212 can determine that a plurality of service issues can be associated with the vehicle, with individual confidence levels associated with individual service issues. In some instances, the fault diagnosing module 212 can determine one or more error codes associated with a service issue to provide to various modules, or technicians, for example. In some instances, the fault diagnosing module 212 can include one or more machine learning algorithms to determine service issues based on the sensor data and/or diagnosed fault, as described above.

At operation 310, the process can include providing instruction(s) to an autonomous vehicle for servicing. In some examples, the instructions can include, but are not limited to: an instruction to stay at a current location; an instruction to navigate to a location of a technician (e.g., a current location of the technician); an instruction to navigate to a location associated with a technician (e.g., a meeting point for the vehicle and technician); or an instruction to navigate to a home garage or service center. In some examples, the operation 310 can include determining a route or trajectory for the vehicle, and generating commands (e.g., forward acceleration, braking, steering angle, etc.) so that the control system (e.g., controller) can navigate the vehicle in accordance with the commands. As described above, in some examples, the instruction(s) can direct the vehicle to call a teleoperator for assistance in redressing the fault.

FIG. 4 depicts an example process 400 for determining a fault associated with an autonomous vehicle. For example, some or all of the process 400 can be performed by one or more components in the architecture 200, or in the environment 600, as described herein.

At operation 402, the process can include determining an expected behavior of a vehicle. In at least one example, the fault determining module 210 can determine an expected behavior of a vehicle. In some examples, a model of a vehicle can be stored in association with the computer system(s) 202. That is, in at least one example, a model of a vehicle that is not subjected to any environmental factors and/or not having any wear caused by use, can leverage associated sensor data to generate a model of the vehicle. The model can be associated with the vehicle and used by the fault determining module 210 to determine an expected behavior of the vehicle.

In some examples, the vehicle tracking module 204 can receive information associated with navigating a vehicle along a particular path. That is, in some examples, the vehicle tracking module 204 can receive trajectories associated with navigating the vehicle along a particular path. In some examples, the trajectory can be used to determine an expected behavior of the vehicle (i.e., the path that the vehicle is supposed to follow). That is, a trajectory can indicate how a vehicle is expected to behave.

In additional and/or alternative example, as described above, the expected behavior of a vehicle can be determined based on aggregated data indicative of a nominal behavior of a fleet of vehicles. For example, in a fleet involving at least two vehicles, performance of individual vehicles can be monitored and aggregated to determine a nominal performance. Such aggregation can be with respect to the vehicle as a whole, with respect to individual components, subsystems, systems of the vehicle, data quality of each data source (e.g. a number and intensity of LIDAR returns), or any combination thereof. A nominal performance can correspond to an average performance, a median performance, or some other standardized value indicative of the performance of the fleet of vehicles. That is, the nominal performance can be indicative of an expected behavior of a vehicle. In some examples, as described above, the nominal performance can correspond to a particular segment of road. In at least one example, the fault determining module 210 can leverage the aggregated data to determine how a vehicle is expected to behave.

At operation 404 the process can include determining, based at least in part on data associated with the vehicle, a behavior associated with the vehicle, as described above in operation 304 of process 300.

At operation 406, the process can include comparing the behavior with the expected behavior to determine a differential between the behavior and the expected behavior. In at least one example, the fault determining module 210 can compare the behavior and the expected behavior to determine a differential between the behavior and the expected behavior. In at least one example, a differential can correspond to a quantification of the difference in expected and actual behaviors. For instance, a differential can correspond to a lateral error, rotational error, and/or longitudinal error. That is, the differential can correspond to measurement indicative of a lateral, rotational, and/or longitudinal distance between an expected position of a vehicle and an actual position of the vehicle. Or, in another example, the differential can correspond to a measurement representative of an expected performance of a vehicle (e.g., acceleration, deceleration, braking distance, HVAC performance, energy input, energy expenditure, etc.). Further, in yet an additional example, the differential can correspond to a measurement representative of an expected repetitive frequency associated with a vehicle and an actual repetitive frequency associated with the vehicle. Though described in FIG. 4 as a differential for illustrative purposes, any other algorithm can be performed to determine that a behavior of a vehicle does not conform with an expected, or nominal, behavior as described in detail herein.

At operation 408, the process can include determining whether the differential meets a threshold. In at least one example, the fault determining module 210 can compare the differential with a threshold and can determine a fault based on the relationship between the differential and the threshold. For instance, based at least in part on determining that the differential does not meet the threshold, the process can include determining that the behavior is not associated with a fault, as illustrated at operation 410. Or, based at least in part on determining that the differential meets the threshold, the process can include determining that the behavior is associated with a fault, as illustrated at operation 412. In some examples, the fault determining module 210 can refrain from determining a fault until the differential meets the threshold for more than a predetermined period of time. It should be noted that in some examples, as an alternative to determining whether the differential meets a threshold, the fault determining module 210 can determine whether the differential exceeds a threshold, is below a threshold, or has some other relationship to the threshold to determine whether a behavior is associated with a fault.

FIG. 4 illustrates but one example process of determining a fault. As described above, in additional and/or alternative examples, the fault determining module 210 can determine a fault based on a comparison between any one or more measured characteristics and corresponding expected characteristic(s). For instance, in an example, the fault determining module 210 can determine a fault based at least in part on determining that a smell differs from an expected smell of a vehicle by a particular threshold for more than a predetermined period of time.

FIG. 5 depicts an example process 500 for diagnosing a fault associated with an autonomous vehicle. For example, some or all of the process 400 can be performed by one or more components in the architecture 200, or in the environment 600, as described herein.

At operation 502, the process can include determining a fault associated with a vehicle based at least in part on a behavior of the vehicle, as described above with reference to FIG. 4.

At operation 504, the process can include transmitting a command associated with diagnosing the fault to at least one information source associated with the vehicle. In at least one example, based at least in part on determining a fault, the fault diagnosing module 212 can perform one or more queries to diagnose the fault. That is, the fault diagnosing module 212 can send one or more commands to one or more information sources to identify a component (or multiple components) of the vehicle that is causing the vehicle to behave in a way that is different than expected. As described herein, an information source can correspond to a component system of a component of the vehicle, a database 216, described above, or a control system associated with controlling the behavior and/or state of the vehicle.

For instance, in at least one example, the fault diagnosing module 212 can query one or more components of a vehicle to determine a state of each of the components. As described above, various components of a vehicle can be associated with component systems. For instance, a drivetrain system of the vehicle can be associated with a drivetrain component system, a suspension system of the vehicle can be associated with a suspension component system, a braking system of the vehicle can be associated with a braking component system, etc. A component system can correspond to a microcontroller associated with a component that outputs data indicative of a state of the component. In at least one example, the fault diagnosing module 212 can send a command to a component system for the state of the corresponding component. Each component system can generate a response based on the state of the corresponding component.

In additional and/or alternative examples, the fault diagnosing module 212 can send a command to a database inquiring whether a determined behavior is mapped to, or otherwise associated with, a particular source of a fault. As described above, the behavior-fault database 218 can include associations between behavior(s) and source(s) of fault(s). For example, a particular behavior can be mapped to, or otherwise associated with, one or more sources of faults. As a non-limiting example, a repetitive frequency behavior can be mapped to a source of a fault corresponding to an incapacitated suspension system, an incapacitated tire, a bad road, etc. As another non-limiting example, a lateral error above a threshold can be mapped to a source of a fault corresponding to an incapacitated brake pad, an incapacitated hub assembly, a crosswind, etc. In some examples, each source of a fault can be associated with a confidence value indicative of a likelihood that the source of the fault is associated with the behavior. The confidence value can be determined based on previously diagnosed faults.

In at least one example, the fault diagnosing module 212 can send a command to the behavior-fault database 218 inquiring whether the behavior is mapped to a source of a fault. That is, the command can be associated with data indicative of the behavior. The behavior-fault database 218 can identify a behavior in the database and can identify one or more sources of faults that are mapped to, or otherwise associated with, the behavior. In at least one example, the command can instruct the behavior-fault database 218 to perform a simple lookup (e.g., data associated with a particular behavior is associated with a likelihood of a particular fault), determine a distance in a parameter vector between data associated with a particular behavior and a known fault (e.g., a Euclidian distance between a vector of all data can be compared with the same vector as associated with a fault, wherein a distance that does not meet some threshold can be indicative of a fault), or analyze the data associated with the particular behavior utilizing a machine learned model, as described above, though any other inquiry is contemplated.

The behavior-fault database 218 can generate a response based on the one or more sources that are mapped to, or otherwise associated with, the behavior. In examples where the behavior is mapped to, or otherwise associated with, a condition and/or environmental factor, the behavior-fault database 218 can send a response indicating that the behavior is associated with a condition and/or environmental factor (instead of one or more components of the vehicle), and the fault diagnosing module 212 can utilize such information in diagnosing the fault.

Or, in some examples, the fault diagnosing module 212 can send a command to a database inquiring whether sensor data associated with the vehicle corresponds to stored data indicative of the behavior of other vehicles that are associated with a particular source of a fault. As described above, the predetermined behavior database 220 can store data indicative of behavior(s) previously exhibited by vehicle(s) associated with particular sources of faults. For example, sensor data associated with one or more vehicles associated with a particular source of a fault associated with a component of a vehicle can be stored in the predetermined behavior database 220 as a representative behavior of one or more vehicles associated with the source of the fault. That is, such sensor data can be mapped to, or otherwise associated with, a particular source of a fault associated with the component of the vehicle. Furthermore, in some examples, the predetermined behavior database 220 can store data indicative of behavior(s) previously exhibited by vehicle(s) that are subject to source of a fault associated with a condition and/or environmental factor (e.g., crosswind, etc.).

In at least one example, the fault diagnosing module 212 can send a command to the predetermined behavior database 220 inquiring whether the data associated with the behavior corresponds to data associated with a vehicle having a particular source of a fault. That is, the command can be associated with data indicative of the behavior of the vehicle. In such examples, the predetermined behavior database 220 can compare the data indicative of the behavior with stored data. Based at least in part on determining that the data indicative of the behavior is within a threshold similarity measure of a stored data item, the predetermined behavior database 220 can determine that the behavior corresponds to a particular source of a fault associated with the stored data item. In additional and/or alternative examples, the command can instruct the predetermined behavior database 220 to perform a simple lookup (e.g., data associated with a particular behavior is associated with a vehicle having a particular source of a fault), determine a distance in a parameter vector between data associated with a particular behavior and a known source of a fault (e.g., a Euclidian distance between a vector of all data can be compared with the same vector as associated with a known source of a fault, wherein a distance that does not meet some threshold can be indicative of a source of a fault), or analyze the data associated with the particular behavior utilizing a machine learned model, as described above, though any other inquiry is contemplated.

In examples where the stored data item corresponds to a condition and/or environmental factor, the predetermined behavior database 220 can send a response indicating that the behavior is associated with a condition and/or environmental factor (instead of one or more components of a vehicle), and the fault diagnosing module 212 can utilize such information in diagnosing the fault.

Furthermore, in some examples, the fault diagnosing module 212 can send a command to a control system (i.e., controller) to effectuate a change to the behavior and/or the state of the vehicle. As described above, a vehicle can include sensors monitoring vehicle components, for perceiving objects and obstacles in an environment, and for navigating the vehicle to a destination. In an example, a vehicle can include a planner system for determining a route or trajectory for the vehicle, and generating commands (e.g., forward acceleration, braking, steering angle, etc.) so that a control system (e.g., controller) can navigate the vehicle in accordance with the commands. In at least one example, the fault diagnosing module 212 can send a command to the control system to effectuate a change to the behavior and/or the state of the vehicle. The control system can generate a response based on analyzing the response of the vehicle to the change to the behavior and/or the state of the vehicle. The fault diagnosing module 212 can evaluate the response to diagnose a fault. That is, the fault diagnosing module 212 can perform motion-based self-diagnostics in an effort to diagnose a fault.

For instance, based on determining a fault based on a longitudinal behavior that can be caused by friction associated with a brake, the fault diagnosing module 212 can send a command to the control system to adjust the friction on the other brakes to determine whether such an adjustment changes the behavior of the vehicle (e.g., corrects the longitudinal behavior). Or, based on determining a fault based on a lateral behavior that can be caused by a crosswind, the fault diagnosing module 212 can send a command to the control system to adjust the direction of travel of the vehicle to determine whether such an adjustment changes the behavior of the vehicle (e.g., corrects the lateral behavior.

At operation 506, the process can include receiving a response from the at least one information source. The fault diagnosing module 212 can receive a response to a command. For instance, responsive to sending a request to one or more component systems, the one or more component systems can send response(s) indicative of state(s) of each of the components. Or, responsive to sending a command to the database(s) 216, each respective database (e.g., behavior-fault database 218 and/or predetermined behavior database 220) can send a response indicating whether the behavior is associated with a source of a fault (and if so, identifying the source of the fault). Further, responsive to sending a command to a control system for adjusting at least one of the behavior and/or state of the vehicle, the control system (or another module associated with the computer system(s) 202) can send an indication as to whether the adjustment caused a change to the behavior of the vehicle to self-correct the fault.

At operation 508, the process can include diagnosing the fault based at least in part on the response. The fault diagnosing module 212 can include functionality to diagnose the fault based at least in part on the response. That is, in at least one example, the fault diagnosing module 212 can receive a response and can diagnose the fault by identifying which component(s) associated with the vehicle are incapacitated and/or are causing the vehicle to behave differently than expected.

For instance, in an example, the fault diagnosing module 212 can receive a response from the one or more component systems which can be indicative of state(s) of each of the components. In such an example, the fault diagnosing module 212 can leverage the state(s) of each of the components to diagnose the fault. Additionally and/or alternatively, in an example, the fault diagnosing module 212 can receive a response from a database (e.g., behavior-fault database 218 and/or predetermined behavior database 220) which can indicate whether a behavior is associated with a source of a fault (and if so, identifying the source of the fault). In such an example, the fault diagnosing module 212 can leverage the response to diagnose the fault.

Additionally and/or alternatively, the fault diagnosing module 212 can receive an indication as to whether the adjustment caused a change to the behavior of the vehicle to self-correct the fault from the control system (or another module associated with the computer system(s) 202). The fault diagnosing module 212 can diagnose the fault based on the indication. For instance, based on determining a fault based on a longitudinal behavior that can be caused by friction associated with a brake, the fault diagnosing module 212 can send a command to the control system to adjust the force applied on the other brakes to determine whether such an adjustment changes the behavior of the vehicle (e.g., corrects the longitudinal behavior), as described above. If the fault diagnosing module 212 determines that the vehicle changes behavior responsive to the command, the fault diagnosing module 212 can diagnose the fault as a brake issue. Alternatively, if the fault diagnosing module 212 determines that the vehicle does not change behavior responsive to the command, the fault diagnosing module 212 can determine that the fault is not likely to be a brake issue. Or, as described above, based on determining a fault based on a lateral behavior that can be caused by a crosswind, the fault diagnosing module 212 can send a command to the control system to adjust the direction of travel of the vehicle to determine whether such an adjustment changes the behavior of the vehicle (e.g., corrects the lateral behavior). If the fault diagnosing module 212 determines that the vehicle changes behavior responsive to the command, the fault diagnosing module 212 can diagnose the fault as being associated with wind. Alternatively, if the fault diagnosing module 212 determines that the vehicle does not change behavior responsive to the command, the fault diagnosing module 212 can determine that the fault is not likely to be associated with wind.

In some examples, the fault diagnosing module 212 can send commands to more than one information source. In such examples, the fault diagnosing module 212 can receive responses from more than one information source. That is, in such examples, the diagnosing module 212 can leverage redundancy associated with the responses to diagnose a fault.

The fault diagnosing module 212 can include functionality to determine service issues that can be associated with a particular vehicle based at least in part on diagnoses of faults associated with the particular vehicle. For example, the fault diagnosing module 212 can include operations to determine what component(s) of a vehicle can be in need of service based on a diagnosed fault. In some instances, the fault diagnosing module 212 can determine that a plurality of service issues can be associated with the vehicle, with individual confidence levels associated with individual service issues. In some instances, the fault diagnosing module 212 can determine one or more error codes associated with a service issue to provide to various modules, or technicians, for example. In some instances, the fault diagnosing module 212 can include one or more machine learning algorithms to determine service issues based on the data, as described above.

FIG. 5 illustrates but one example process of diagnosing a fault. As described above, in additional and/or alternative examples, the fault diagnosing module 212 can diagnose a fault based on data indicative of any characteristic and such diagnoses is not limited to data indicative of a behavior.

Furthermore, though illustrated in FIGS. 4 and 5 as distinct operations, in some examples, any one or more of operations 402-408 and/or 502-508 can be performed substantially simultaneously. As a non-limiting example, one or more data (e.g. sensor data) can be input into one or more algorithms which simultaneously output the presence of a fault and a set of zero or more proposed diagnoses, with corresponding confidence levels. Such algorithms can comprise, for example, neural networks, mappings, differentials, or other associations of data with diagnoses.

Figure 6:
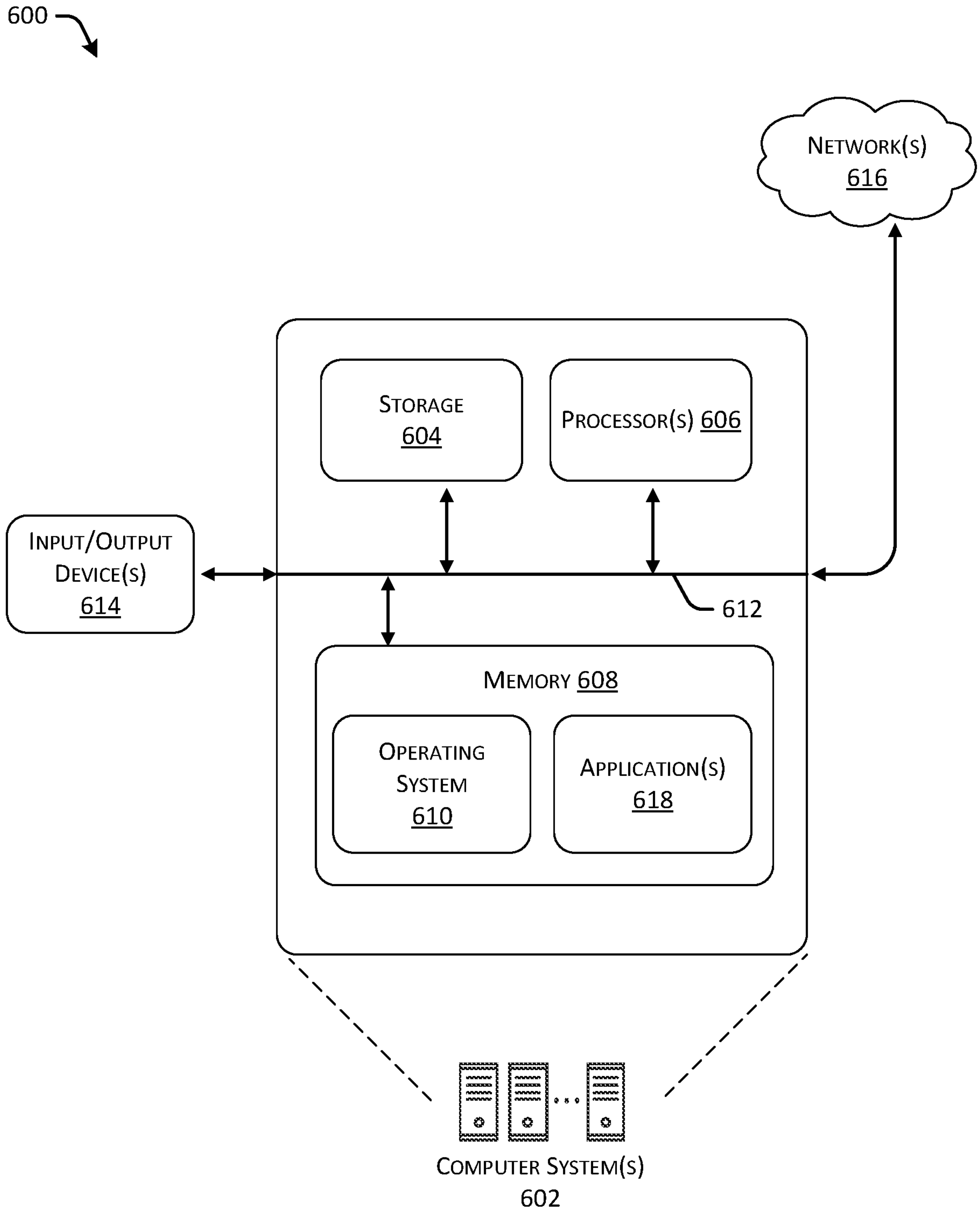
FIG. 6 depicts a block diagram of an example computer system for implementing the techniques described herein.

FIG. 6 illustrates an environment 600 in which the disclosures can be implemented in whole or in part. The environment 600 depicts one or more computer systems 602 that comprise a storage 604, one or more processor(s) 606, a memory 608, and an operating system 610. The storage 604, the processor(s) 606, the memory 608, and the operating system 610 can be communicatively coupled over a communication infrastructure 612. Optionally, the computer system 602 can interact with a user, or environment, via input/output (I/O) device(s) 614, as well as one or more other computing devices over a network 616, via the communication infrastructure 612. The operating system 610 can interact with other components to control one or more applications 618.

In some examples, the computer system(s) 602 can correspond to the computer system(s) 202 of FIG. 2. Further, the computer system(s) 602 can implement any hardware and/or software to implement the modules 204, 206, 208, 210, 212, 214 and/or databases 216, 218, and 220 and to perform vehicle self-diagnostics, as discussed herein.

The systems and methods described herein can be implemented in software or hardware or any combination thereof. The systems and methods described herein can be implemented using one or more computing devices which may or may not be physically or logically separate from each other. The methods can be performed by components arranged as either on-premise hardware, on-premise virtual systems, or hosted-private examples. Additionally, various aspects of the methods described herein can be combined or merged into other functions.

An exemplary environment and computerized system for implementing the systems and methods described herein is illustrated in FIG. 6. A processor or computer system can be configured to particularly perform some or all of the methods described herein. In some embodiments, the methods can be partially or fully automated by one or more computers or processors. The systems and methods described herein can be implemented using a combination of any of hardware, firmware, and/or software. The present systems and methods described herein (or any part(s) or function(s) thereof) can be implemented using hardware, software, firmware, or a combination thereof and can be implemented in one or more computer systems or other processing systems. In some embodiments, the illustrated system elements could be combined into a single hardware device or separated into multiple hardware devices. If multiple hardware devices are used, the hardware devices could be physically located proximate to or remotely from each other. The embodiments of the methods described and illustrated are intended to be illustrative and not to be limiting. For example, some or all of the steps of the methods can be combined, rearranged, and/or omitted in different embodiments.

In one exemplary embodiment, the systems and methods described herein can be directed toward one or more computer systems capable of carrying out the functionality described herein. Example computing devices can be, but are not limited to, a personal computer (PC) system running any operating system such as, but not limited to, OS X™, iOS™, Linux™, Android™, and Microsoft™ Windows™. However, the systems and methods described herein can not be limited to these platforms. Instead, the systems and methods described herein can be implemented on any appropriate computer system running any appropriate operating system. Other components of the systems and methods described herein, such as, but not limited to, a computing device, a communications device, mobile phone, a smartphone, a telephony device, a telephone, a personal digital assistant (PDA), a personal computer (PC), a handheld PC, an interactive television (iTV), a digital video recorder (DVD), client workstations, thin clients, thick clients, proxy servers, network communication servers, remote access devices, client computers, server computers, routers, web servers, data, media, audio, video, telephony or streaming technology servers, etc., can also be implemented using a computing device. Services can be provided on demand using, e.g., but not limited to, an interactive television (iTV), a video on demand system (VOD), and via a digital video recorder (DVR), or other on demand viewing system.

The system can include one or more processors. The processor(s) can be connected to a communication infrastructure, such as but not limited to, a communications bus, cross-over bar, or network, etc. The processes and processors need not be located at the same physical locations. In other words, processes can be executed at one or more geographically distant processors, over for example, a LAN or WAN connection. Computing devices can include a display interface that can forward graphics, text, and other data from the communication infrastructure for display on a display unit.

The computer system can also include, but is not limited to, a main memory, random access memory (RAM), and a secondary memory, etc. The secondary memory can include, for example, a hard disk drive and/or a removable storage drive, such as a compact disc drive CD-ROM, etc. The removable storage drive can read from and/or written to a removable storage unit. As can be appreciated, the removable storage unit can include a computer usable storage medium having stored therein computer software and/or data. In some embodiments, a machine-accessible medium can refer to any storage device used for storing data accessible by a computer. Examples of a machine-accessible medium can include, e.g., but not limited to: a magnetic hard disk; a floppy disk; an optical disk, like a compact disc read-only memory (CD-ROM) or a digital versatile disc (DVD); a magnetic tape; and/or a memory chip, etc.

The processor can also include, or be operatively coupled to communicate with, one or more data storage devices for storing data. Such data storage devices can include, as non-limiting examples, magnetic disks (including internal hard disks and removable disks), magneto-optical disks, optical disks, read-only memory, random access memory, and/or flash storage. Storage devices suitable for tangibly embodying computer program instructions and data can also include all forms of non-volatile memory, including, for example, semiconductor memory devices, such as EPROM, EEPROM, and flash memory devices; magnetic disks such as internal hard disks and removable disks; magneto-optical disks; and CD-ROM and DVD-ROM discs. The processor and the memory can be supplemented by, or incorporated in, ASICs (application-specific integrated circuits).

The processing system can be in communication with a computerized data storage system. The data storage system can include a non-relational or relational data store, such as a MySQL™ or other relational database. Other physical and logical database types could be used. The data store can be a database server, such as Microsoft SQL Server™, Oracle™, IBM DB2™, SQLITE™, or any other database software, relational or otherwise. The data store can store the information identifying syntactical tags and any information required to operate on syntactical tags. In some embodiments, the processing system can use object-oriented programming and can store data in objects. In these embodiments, the processing system can use an object-relational mapper (ORM) to store the data objects in a relational database. The systems and methods described herein can be implemented using any number of physical data models. In one example embodiment, a relational database management system (RDBMS) can be used. In those embodiments, tables in the RDBMS can include columns that represent coordinates. In the case of economic systems, data representing companies, products, etc., can be stored in tables in the RDBMS. The tables can have pre-defined relationships between them. The tables can also have adjuncts associated with the coordinates.

In alternative exemplary embodiments, secondary memory can include other similar devices for allowing computer programs or other instructions to be loaded into a computer system. Such devices can include, for example, a removable storage unit and an interface. Examples of such can include a program cartridge and cartridge interface (such as, e.g., but not limited to, those found in video game devices), a removable memory chip (such as, e.g., but not limited to, an erasable programmable read only memory (EPROM), or programmable read only memory (PROM) and associated socket), and other removable storage units and interfaces, which can allow software and data to be transferred from the removable storage unit to computer system.

The computing device can also include an input device such as, but not limited to, a voice input device, such as a microphone, touch screens, gesture recognition devices, such as cameras, other natural user interfaces, a mouse or other pointing device such as a digitizer, and a keyboard or other data entry device. The computing device can also include output devices, such as but not limited to, a display, and a display interface. The computing device can include input/output (I/O) devices such as but not limited to a communications interface, cable and communications path, etc. These devices can include, but are not limited to, a network interface card, and modems. Communications interface(s) can allow software and data to be transferred between a computer system and one or more external devices.

In one or more embodiments, the computing device can be operatively coupled to an automotive system. Such automotive system can be either manually operated, semi-autonomous, or fully autonomous. In such an embodiment, input and output devices can include one or more image capture devices, controllers, microcontrollers, and/or other processors to control automotive functions such as, but not limited to, acceleration, braking, and steering. Further, communication infrastructure in such embodiments can also include a Controller Area Network (CAN) bus.

In one or more embodiments, the computing device can be operatively coupled to any machine vision based system. For example, such machine based vision systems include but are not limited to manually operated, semi-autonomous, or fully autonomous industrial or agricultural robots, household robot, inspection system, security system, etc. That is, the embodiments described herein are not limited to one particular context and can be applicable to any application utilizing machine vision.

In one or more embodiments, the present embodiments can be practiced in the environment of a computer network or networks. The network can include a private network, or a public network (for example the Internet, as described below), or a combination of both. The network can include hardware, software, or a combination of both.

From a telecommunications-oriented view, the network can be described as a set of hardware nodes interconnected by a communications facility, with one or more processes (hardware, software, or a combination thereof) functioning at each such node. The processes can inter-communicate and exchange information with one another via communication pathways between them using interprocess communication pathways. On these pathways, appropriate communications protocols are used.

An exemplary computer and/or telecommunications network environment in accordance with the present embodiments can include nodes, which can include hardware, software, or a combination of hardware and software. The nodes can be interconnected via a communications network. Each node can include one or more processes, executable by processors incorporated into the nodes. A single process can be run by multiple processors, or multiple processes can be run by a single processor, for example. Additionally, each of the nodes can provide an interface point between network and the outside world, and can incorporate a collection of sub-networks.

In an exemplary embodiment, the processes can communicate with one another through interprocess communication pathways supporting communication through any communications protocol. The pathways can function in sequence or in parallel, continuously or intermittently. The pathways can use any of the communications standards, protocols or technologies, described herein with respect to a communications network, in addition to standard parallel instruction sets used by many computers.

The nodes can include any entities capable of performing processing functions. Examples of such nodes that can be used with the embodiments include computers (such as personal computers, workstations, servers, or mainframes), handheld wireless devices and wireline devices (such as personal digital assistants (PDAs), modem cell phones with processing capability, wireless email devices including BlackBerry™ devices), document processing devices (such as scanners, printers, facsimile machines, or multifunction document machines), or complex entities (such as local-area networks or wide area networks) to which are connected a collection of processors, as described. For example, in the context of the present disclosure, a node itself can be a wide-area network (WAN), a local-area network (LAN), a private network (such as a Virtual Private Network (VPN)), or collection of networks.

Communications between the nodes can be made possible by a communications network. A node can be connected either continuously or intermittently with communications network. As an example, in the context of the present disclosure, a communications network can be a digital communications infrastructure providing adequate bandwidth and information security.

The communications network can include wireline communications capability, wireless communications capability, or a combination of both, at any frequencies, using any type of standard, protocol or technology. In addition, in the present embodiments, the communications network can be a private network (for example, a VPN) or a public network (for example, the Internet).

A non-inclusive list of exemplary wireless protocols and technologies used by a communications network can include Bluetooth™, general packet radio service (GPRS), cellular digital packet data (CDPD), mobile solutions platform (MSP), multimedia messaging (MMS), wireless application protocol (WAP), code division multiple access (CDMA), short message service (SMS), wireless markup language (WML), handheld device markup language (HDML), binary runtime environment for wireless (BREW), radio access network (RAN), and packet switched core networks (PS-CN). Also included are various generation wireless technologies. An exemplary non-inclusive list of primarily wireline protocols and technologies used by a communications network includes asynchronous transfer mode (ATM), enhanced interior gateway routing protocol (EIGRP), frame relay (FR), high-level data link control (HDLC), Internet control message protocol (ICMP), interior gateway routing protocol (IGRP), internetwork packet exchange (IPX), ISDN, point-to-point protocol (PPP), transmission control protocol/internet protocol (TCP/IP), routing information protocol (RIP) and user datagram protocol (UDP). As skilled persons will recognize, any other known or anticipated wireless or wireline protocols and technologies can be used.

Embodiments of the present disclosure can include apparatuses for performing the operations herein. An apparatus can be specially constructed for the desired purposes, or it can comprise a general purpose device selectively activated or reconfigured by a program stored in the device.

In one or more embodiments, the present embodiments are embodied in machine-executable instructions. The instructions can be used to cause a processing device, for example a general-purpose or special-purpose processor, which is programmed with the instructions, to perform the steps of the present disclosure. Alternatively, the steps of the present disclosure can be performed by specific hardware components that contain hardwired logic for performing the steps, or by any combination of programmed computer components and custom hardware components. For example, the present disclosure can be provided as a computer program product, as outlined above. In this environment, the embodiments can include a machine-readable medium having instructions stored on it. The instructions can be used to program any processor or processors (or other electronic devices) to perform a process or method according to the present exemplary embodiments. In addition, the present disclosure can also be downloaded and stored on a computer program product. Here, the program can be transferred from a remote computer (e.g., a server) to a requesting computer (e.g., a client) by way of data signals embodied in a carrier wave or other propagation medium via a communication link (e.g., a modem or network connection) and ultimately such signals can be stored on the computer systems for subsequent execution.

The methods can be implemented in a computer program product accessible from a computer-usable or computer-readable storage medium that provides program code for use by or in connection with a computer or any instruction execution system. A computer-usable or computer-readable storage medium can be any apparatus that can contain or store the program for use by or in connection with the computer or instruction execution system, apparatus, or device.

A data processing system suitable for storing and/or executing the corresponding program code can include at least one processor coupled directly or indirectly to computerized data storage devices such as memory elements. Input/output (I/O) devices (including but not limited to keyboards, displays, pointing devices, etc.) can be coupled to the system. Network adapters can also be coupled to the system to enable the data processing system to become coupled to other data processing systems or remote printers or storage devices through intervening private or public networks. To provide for interaction with a user, the features can be implemented on a computer with a display device, such as an LCD (liquid crystal display), or another type of monitor for displaying information to the user, and a keyboard and an input device, such as a mouse or trackball by which the user can provide input to the computer.

A computer program can be a set of instructions that can be used, directly or indirectly, in a computer. The systems and methods described herein can be implemented using programming languages such as CUDA, OpenCL, Flash™, JAVA™, C++, C, C#, Python, Visual Basic™, JavaScript™ PHP, XML, HTML, etc., or a combination of programming languages, including compiled or interpreted languages, and can be deployed in any form, including as a stand-alone program or as a module, component, subroutine, or other unit suitable for use in a computing environment. The software can include, but is not limited to, firmware, resident software, microcode, etc. Protocols such as SOAP/HTTP can be used in implementing interfaces between programming modules. The components and functionality described herein can be implemented on any desktop operating system executing in a virtualized or non-virtualized environment, using any programming language suitable for software development, including, but not limited to, different versions of Microsoft Windows™, Apple™ Mac™, iOS™, Unix™/X-Windows™, Linux™, etc. The system could be implemented using a web application framework, such as Ruby on Rails.

Suitable processors for the execution of a program of instructions include, but are not limited to, general and special purpose microprocessors, and the sole processor or one of multiple processors or cores, of any kind of computer. A processor can receive and store instructions and data from a computerized data storage device such as a read-only memory, a random access memory, both, or any combination of the data storage devices described herein. A processor can include any processing circuitry or control circuitry operative to control the operations and performance of an electronic device.

The systems, modules, and methods described herein can be implemented using any combination of software or hardware elements. The systems, modules, and methods described herein can be implemented using one or more virtual machines operating alone or in combination with one other. Any applicable virtualization solution can be used for encapsulating a physical computing machine platform into a virtual machine that is executed under the control of virtualization software running on a hardware computing platform or host. The virtual machine can have both virtual system hardware and guest operating system software.

The systems and methods described herein can be implemented in a computer system that includes a back-end component, such as a data server, or that includes a middleware component, such as an application server or an Internet server, or that includes a front-end component, such as a client computer having a graphical user interface or an Internet browser, or any combination of them. The components of the system can be connected by any form or medium of digital data communication such as a communication network. Examples of communication networks include, e.g., a LAN, a WAN, and the computers and networks that form the Internet.

One or more embodiments of the present disclosure can be practiced with other computer system configurations, including hand-held devices, microprocessor systems, microprocessor-based or programmable consumer electronics, minicomputers, mainframe computers, etc. The systems and methods described herein can also be practiced in distributed computing environments where tasks are performed by remote processing devices that are linked through a network.

The terms "computer program medium" and "computer readable medium" can be used to generally refer to media such as but not limited to removable storage drive, a hard disk installed in hard disk drive. These computer program products can provide software to computer system. The systems and methods described herein can be directed to such computer program products.

References to "one embodiment," "an embodiment," "example embodiment," "various embodiments," etc., can indicate that the embodiment(s) of the present disclosure can include a particular feature, structure, or characteristic, but not every embodiment necessarily includes the particular feature, structure, or characteristic. Further, repeated use of the phrase "in one embodiment," or "in an exemplary embodiment," do not necessarily refer to the same embodiment, although they can. Similarly, references to "examples" can indicate that various example(s) of the present disclosure can include a particular feature, structure, or characteristic, but not every example necessarily includes the particular feature, structure, or characteristic. Further, repeated use of the phrase "in some examples" does not necessarily refer to the same example, although it can.

In the description and claims, the terms "coupled" and "connected," along with their derivatives, can be used. It should be understood that these terms can be not intended as synonyms for each other. Rather, in particular embodiments, "connected" can be used to indicate that two or more elements are in direct physical or electrical contact with each other. "Coupled" can mean that two or more elements are in direct physical or electrical contact. However, "coupled" can also mean that two or more elements are not in direct contact with each other, but yet still co-operate or interact with each other.

An algorithm can be here, and generally, considered to be a self-consistent sequence of acts or operations leading to a desired result. These include physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers or the like. It should be understood, however, that all of these and similar terms are to be associated with the appropriate physical quantities and are merely convenient labels applied to these quantities.

Unless specifically stated otherwise, it can be appreciated that throughout the specification terms such as "processing," "computing," "calculating," "determining," or the like, refer to the action and/or processes of a computer or computing system, or similar electronic computing device, that manipulate and/or transform data represented as physical, such as electronic, quantities within the computing system's registers and/or memories into other data similarly represented as physical quantities within the computing system's memories, registers or other such information storage, transmission or display devices.

In a similar manner, the term "processor" can refer to any device or portion of a device that processes electronic data from registers and/or memory to transform that electronic data into other electronic data that can be stored in registers and/or memory. As non-limiting examples, "processor" can be a Central Processing Unit (CPU) or a Graphics Processing Unit (GPU). A "computing platform" can comprise one or more processors. As used herein, "software" processes can include, for example, software and/or hardware entities that perform work over time, such as tasks, threads, and intelligent agents. Also, each process can refer to multiple processes, for carrying out instructions in sequence or in parallel, continuously or intermittently. The terms "system" and "method" are used herein interchangeably insofar as the system can embody one or more methods and the methods can be considered as a system.

While one or more embodiments have been described, various alterations, additions, permutations and equivalents thereof are included within the scope of the disclosure.

In the description of embodiments, reference is made to the accompanying drawings that form a part hereof, which show by way of illustration specific embodiments of the claimed subject matter. It is to be understood that other embodiments can be used and that changes or alterations, such as structural changes, can be made. Such embodiments, changes or alterations are not necessarily departures from the scope with respect to the intended claimed subject matter. While the steps herein can be presented in a certain order, in some implementations the ordering can be changed so that certain inputs are provided at different times or in a different order without changing the function of the systems and methods described. The disclosed procedures could also be executed in different orders. Additionally, various computations that are herein need not be performed in the order disclosed, and other embodiments using alternative orderings of the computations could be readily implemented. In addition to being reordered, the computations could also be decomposed into sub-computations with the same results.

Although the discussion above sets forth example implementations of the described techniques, other architectures can be used to implement the described functionality, and are intended to be within the scope of this disclosure. Furthermore, although specific distributions of responsibilities are defined above for purposes of discussion, the various functions and responsibilities might be distributed and divided in different ways, depending on circumstances.

Furthermore, although the subject matter has been described in language specific to structural features and/or methodological acts, it is to be understood that the subject matter defined in the appended claims is not necessarily limited to the specific features or acts described. Rather, the specific features and acts are disclosed as exemplary forms of implementing the claims.

EXAMPLE CLAUSES

A. A system comprising: one or more processors; and one or more computer readable storage media communicatively coupled to the one or more processors and storing instructions that are executable by the one or more processors to: receive sensor data from one or more sensors associated with a vehicle; determine, based at least in part on analyzing at least a portion of the sensor data utilizing a model, a fault associated with the vehicle; send, based at least in part on determining the fault, a query to at least one component system associated with a component of the vehicle; receive, responsive to sending the query, a response from the at least one component system; determine, based at least in part on the response, that the fault is associated with the component; determine, based at least in part on the fault associated with the component, at least one service issue associated with the vehicle; and provide instructions to the vehicle for redressing the at least one service issue.

B. The system as paragraph A recites, wherein analyzing at least the portion of the sensor data utilizing the model is based at least in part on: determining an expected behavior of the vehicle; determining, based at least in part on the sensor data, a behavior of the vehicle; comparing the expected behavior of the vehicle and the behavior of the vehicle to determine that the behavior does not conform with the expected behavior; and determining the fault based at least in part on the comparison.

C. The system as paragraph B recites, wherein the behavior and the expected behavior are associated with at least one of a lateral behavior of the vehicle, a longitudinal behavior of the vehicle, or a rotational behavior of the vehicle.

D. The system as paragraph B or C recites, wherein the vehicle is one of a fleet of vehicles, and further wherein the instructions are further executable by the one or more processors to: receive additional sensor data associated with other vehicles of the fleet of vehicles; aggregate the additional sensor data to generate aggregated sensor data; and determine the expected behavior based at least in part on a nominal performance associated with the aggregated sensor data.

E. The system as any of paragraphs B-D recite, wherein the behavior and the expected behavior are associated with a path segment.

F. The system as any of paragraphs B-E recite, wherein the instructions are further executable by the one or more processors to: access stored data associated with the vehicle, the stored data indicating a model of the vehicle; and determine the expected behavior based at least in part on the model.

G. The system as any of paragraphs B-F recite, wherein determining the expected behavior of the vehicle is based at least in part on a trajectory along which the vehicle is driving.

H. The system as any of paragraphs A-G recite, wherein the at least one component system comprises a microcontroller associated with the component that is configured to perform diagnostics for the component.

I. The system as any of paragraphs A-H recite, wherein the component comprises at least one of a drivetrain system of the vehicle, a suspension system of the vehicle, a braking system of the vehicle, or a steering system of the vehicle.

J. A method comprising: receiving sensor data associated with a vehicle; determining, based at least in part on the sensor data, a characteristic associated with the vehicle; determining, based at least in part on the characteristic, a fault associated with the vehicle; transmitting, based at least in part on determining the fault and in near real-time, a command associated with diagnosing the fault to at least one information source associated with the vehicle; diagnosing the fault based at least in part on a response to the command; and providing instructions to the vehicle for redressing the fault.

K. The method as paragraph J recites, wherein the characteristic is associated with at least one of a longitudinal behavior of the vehicle, a lateral behavior of the vehicle, or a rotational behavior of the vehicle.

L. The method as any of paragraphs J or K recite, wherein the characteristic is associated with a repetitive frequency of the vehicle.

M. The method as any of paragraphs J-L recite, wherein the characteristic is associated with an actuator response of the vehicle.

N. The method as any of paragraphs J-M recite, wherein: the information source corresponds to a component system associated with a component of the vehicle; the command corresponds to a query regarding a state of the component; and the response corresponds to the state of the component received from the component system.

O. The method as any of paragraphs J-N recite, wherein: the information source corresponds to a database associated with the vehicle; the command corresponds to a query to determine whether the characteristic is associated with one or more sources of faults in the database; and the response corresponds to an indication that the characteristic is associated with a source of the one or more sources.

P. The method as any of paragraphs J-O recite, wherein: the information source corresponds to a controller associated with the vehicle; the command corresponds to an instruction to change at least one of the characteristic of the vehicle or a state of the vehicle; and the response corresponds to an effect of the change to the at least one of the characteristic of the vehicle or the state of the vehicle.

Q. The method as any of paragraphs J-P recite, wherein: the information source corresponds to a database associated with the vehicle; the command corresponds to a query to access data indicative of respective vehicle characteristic associated with one or more sources of faults; and the response corresponds to an indication that the characteristic corresponds to a source of the one or more sources.

R. The method as any of paragraphs J-Q recite, wherein diagnosing the fault is based at least in part on responses received from two or more information sources.

S. A system associated with a vehicle, the system comprising: one or more processors; and one or more computer readable storage media communicatively coupled to the one or more processors and storing instructions that are executable by the one or more processors to: receive sensor data associated with the vehicle; analyze at least a portion of the sensor data utilizing a model; diagnose a fault associated with the vehicle based at least in part on analyzing at least the portion of the sensor data utilizing the model; and provide instructions to the vehicle for redressing the fault.

T. The system as paragraph S recites, wherein the model is trained based at least in part on inputting data associated with one or more faults and corresponding sensor data into a machine learning mechanism.

While paragraphs A-I are described above with respect to a system, it is understood in the context of this document that the content of paragraphs A-I may also be implemented via a method, device, and/or computer storage media. While paragraphs J-R are described above with respect to a method, it is understood in the context of this document that the content of paragraphs J-R may also be implemented via a system, device, and/or computer storage media. While paragraphs S and T are described above with respect to a system, it is understood in the context of this document that the content of paragraphs S and T may also be implemented via a method, device, and/or computer storage media.

What is claimed is:

1. A system associated with a vehicle, the system comprising:
one or more processors; and
one or more non-transitory computer readable storage media storing instructions that are executable by the one or more processors to:
receive sensor data from a sensor on the vehicle;
determine, based at least on a portion of the sensor data, a behavior of the vehicle based on aggregate vehicle performance;
determine an expected behavior of the vehicle, the expected behavior of the vehicle being based at least in part on a nominal characteristic determined based at least in part on a performance of a fleet of vehicles;
determine a deviation between the behavior of the vehicle based on the aggregate vehicle performance and the expected behavior of the vehicle; and
determine, based at least in part on the behavior of the vehicle based on the aggregate vehicle performance deviating from the expected behavior by meeting or exceeding a threshold deviation, a confidence value indicative that a component of the vehicle is associated with a fault.

2. The system of claim 1, wherein:
the sensor comprises one or more of a camera, a lidar sensor, or a radar sensor; and
determining the behavior comprises:
determining, based at least in part on the sensor data, a localization of the vehicle in an environment.

3. The system of claim 1, wherein:
the expected behavior is determined based at least in part on one or more of a braking signal or a steering angle rate; and
determining the behavior comprises determining one or more of an acceleration, a velocity, a yaw, or a yaw rate.

4. The system of claim 1, the instructions are further executable by the one or more processors to:
query, based at least in part on the behavior of the vehicle deviating from the expected behavior by meeting or exceeding the threshold deviation, the component of the vehicle;
receive a response from the component comprising a diagnostic result performed by a microcontroller for the component; and
determine, based at least in part on the response, the confidence value indicative that the component of the vehicle is associated with the fault.

5. The system of claim 1, wherein:
the expected behavior comprises a desired braking distance;
determining the behavior comprises determining a measured braking distance;
determining the deviation comprises determining that the desired braking distance differs from the measured braking distance; and
determining the confidence value indicative that the component of the vehicle is associated with the fault comprises determining the fault is associated with a braking system of the vehicle.

6. The system of claim 1, wherein:
the expected behavior comprises a desired yaw rate,
determining the behavior comprises determining a measured yaw rate,
determining the deviation comprises determining that the measured yaw rate differs from the desired yaw rate, and
determining the confidence value indicative that the component of the vehicle is associated with the fault comprises determining the fault is associated with a braking system of the vehicle.

7. The system of claim 1, wherein:
the deviation between the behavior of the vehicle and
the expected behavior of the vehicle is at least partially attributable to a road condition or a weather condition.

8. The system of claim 1, wherein the instructions are further executable by the one or more processors to:
determine, based at least on a portion of the sensor data, that at least a portion of the deviation between the behavior of the vehicle and
the expected behavior of the vehicle is independent of a road condition or a weather condition.

9. The system of claim 1, wherein:
the confidence value is a first confidence value associated with a first fault;
the instructions are further executable by the one or more processors to determine a second confidence value associated with a second fault, and
the first confidence value and the second confidence value are based at least in part on a portion of the sensor data.

10. The system of claim 1, wherein:
the sensor data includes two or more of LIDAR data, image data, radar data, SONAR data, GPS data, wheel encoder data, IMU data, engine performance data, energy level, fuel level, cabin temperature, HVAC status, braking inputs, steering inputs, tire pressure, vehicle weight, route information, environmental factors, vehicle maintenance history, vehicle navigation history, or fleet operations data.

11. A method comprising:

receiving sensor data from a sensor on a vehicle;

determining, based at least on a portion of the sensor data, a behavior associated with the vehicle, the behavior comprising an actual position of the vehicle in an environment;

determining a deviation between the behavior associated with the vehicle and an expected behavior based on aggregate vehicle performance, the expected behavior comprises an expected position of the vehicle in the environment, and wherein the deviation comprises a distance between the actual position of the vehicle and the expected position of the vehicle; and detecting, based at least in part on the behavior associated with the vehicle deviating from the expected behavior by meeting or exceeding a threshold deviation, a confidence value indicative that a component of the vehicle is associated with a fault.

12. The method of claim 11, wherein:

the sensor comprises one or more of a camera, a lidar sensor, or a radar sensor;

the behavior is associated with at least one of a longitudinal behavior of the vehicle, a lateral behavior of the vehicle, or a rotational behavior of the vehicle;

the expected behavior is based at least in part on one or more of a nominal characteristic of a fleet of vehicles or a control command issued to the vehicle; and determining the behavior comprises:

determining, based at least in part on the sensor data, a localization of the vehicle in an environment.

13. The method of claim 11, further comprising:

determining the expected behavior based at least in part on one or more of a braking signal, a torque signal, a steering angle, or a steering angle rate, wherein determining the behavior comprises determining one or more of an acceleration, a velocity, a yaw, or a yaw rate.

14. The method of claim 11, wherein:

the expected behavior is associated with a command to apply an amount of braking to achieve a desired deceleration;

the behavior is associated with a longitudinal behavior;

determining the behavior comprises determining, based at least in part on the sensor data, a measured deceleration;

determining the deviation comprises determining the desired deceleration differs from the measured deceleration; and determining the confidence value indicative that the component of the vehicle is associated with the fault comprises determining the fault is associated with a braking system of the vehicle.

15. The method of claim 11, wherein:

the expected behavior is based at least in part on a command to apply an amount of steering to achieve a desired yaw rate;

determining the behavior comprises determining a measured yaw rate;

determining the deviation comprises determining the measured yaw rate differs from the desired yaw rate; and determining the confidence value indicative that the component of the vehicle is associated with the fault comprises determining the fault is associated with a braking system of the vehicle.

16. The method of claim 11, wherein:

the expected behavior is based at least in part on a command to apply an amount of steering to achieve a desired lateral acceleration rate;

determining the behavior comprises determining a measured lateral acceleration rate;

determining the deviation comprises determining the measured lateral acceleration rate differs from the desired lateral acceleration rate; and determining the confidence value indicative that the component of the vehicle is associated with the fault comprises determining that the fault is associated with one or more of a braking system or a hub assembly of the vehicle.

17. The method of claim 11, further comprising:

transmitting, to at least one information source associated with the vehicle, a command associated with diagnosing the fault;

receiving, responsive to the command, a response from the at least one information source; and determining, based at least in part on the response, the confidence value indicative that the component of the vehicle is associated with the fault.

18. One or more non-transitory computer-readable media storing instructions that, when executed, cause one or more processors to perform operations comprising:

receiving sensor data from a sensor on a vehicle;

determining, based at least on a portion of the sensor data, a behavior of the vehicle, the behavior comprising an amount of torque applied to a wheel of the vehicle;

determining a deviation between the behavior of the vehicle and an expected behavior of the vehicle, the expected behavior of the vehicle being determined based on a model of the vehicle and comprises an expected amount of torque that is expected to be associated with the wheel, and the deviation comprises a difference between the amount of torque applied to the wheel and the expected amount of torque that is expected to be associated with the wheel;

determining a deviation between the behavior of the vehicle and the expected behavior of the vehicle; and determining, based at least in part on the behavior of the vehicle deviating from the expected behavior by meeting or exceeding a threshold deviation, a confidence value indicative that a component of a plurality of components of the vehicle is associated with a fault.

19. The one or more non-transitory computer-readable media of claim 18, wherein:

the behavior is associated with at least one of a longitudinal behavior of the vehicle, a lateral behavior of the vehicle, or a rotational behavior of the vehicle; and the expected behavior is determined based at least in part on one or more of a nominal characteristic of a fleet of vehicles or a command issued to the vehicle.

20. The one or more non-transitory computer-readable media of claim 18, wherein:

the expected behavior is determined based at least in part on one or more of a braking signal, a torque signal, a steering angle, or a steering angle rate; and determining the behavior further comprises:

determining one or more of an acceleration, a velocity, a yaw, or a yaw rate.

21. The one or more non-transitory computer-readable media of claim 18, wherein:

the expected behavior is based at least in part on a command to apply an amount of braking to achieve a desired deceleration;

determining the behavior further comprises determining a measured deceleration;

determining the deviation further comprises determining a difference between the measured deceleration and the desired deceleration; and determining the confidence value indicative that the component of the vehicle is associated with the fault comprises determining the fault is associated with a braking system of the vehicle.

* * * * *